United States Patent
Burke et al.

(10) Patent No.: US 8,888,587 B2
(45) Date of Patent: Nov. 18, 2014

(54) MODIFYING GAMING DEVICES BASED ON PHYSICAL ATTRIBUTES OF DETERMINED GROUPS

(71) Applicant: WMS Gaming, Inc., Waukegan, IL (US)

(72) Inventors: Mary M. Burke, Somonauk, IL (US); Peter Anderson, Glenview, IL (US); Vernon W. Hamlin, Lisle, IL (US)

(73) Assignee: WMS Gaming, Inc., Waukegan, IL (US)

( * ) Notice: Subject to any disclaimer, the term of this patent is extended or adjusted under 35 U.S.C. 154(b) by 82 days.

(21) Appl. No.: 13/778,820

(22) Filed: Feb. 27, 2013

(65) Prior Publication Data

US 2014/0087862 A1     Mar. 27, 2014

Related U.S. Application Data

(60) Provisional application No. 61/705,175, filed on Sep. 25, 2012.

(51) Int. Cl.
| | |
|---|---|
| *G06F 17/00* | (2006.01) |
| *G06F 19/00* | (2011.01) |
| *A63F 13/00* | (2014.01) |
| *G07F 17/32* | (2006.01) |

(52) U.S. Cl.
CPC ............. *A63F 13/00* (2013.01); *G07F 17/3206* (2013.01); *G07F 17/3239* (2013.01); *G07F 17/3272* (2013.01); *G07F 17/3279* (2013.01)
USPC .................................. 463/29; 463/16; 463/36

(58) Field of Classification Search
CPC . G07F 17/32; G07F 17/3225; G07F 17/3227; G07F 17/3237; G07F 17/3272; G07F 17/3281; G07F 17/3283; G07F 17/34
USPC ..................... 463/1, 16–20, 25, 29–31, 40–43
See application file for complete search history.

(56) References Cited

U.S. PATENT DOCUMENTS

| | | | |
|---|---|---|---|
| 6,068,552 A | 5/2000 | Walker et al. | |
| 6,110,041 A | 8/2000 | Walker et al. | |
| 6,254,483 B1 | 7/2001 | Acres | |
| 6,293,866 B1 | 9/2001 | Walker et al. | |
| 6,342,010 B1 | 1/2002 | Slifer | |
| 6,350,199 B1 | 2/2002 | Williams et al. | |
| 6,628,939 B2 | 9/2003 | Paulsen | |
| 6,769,986 B2 | 8/2004 | Vancura | |
| 7,033,276 B2 | 4/2006 | Walker et al. | |
| 7,040,987 B2 | 5/2006 | Walker et al. | |
| 7,169,052 B2 | 1/2007 | Beaulieu et al. | |
| 7,972,213 B2 * | 7/2011 | Walker et al. | 463/40 |
| 8,187,073 B2 | 5/2012 | Beaulieu et al. | |
| 2002/0142846 A1 | 10/2002 | Paulsen | |
| 2003/0003988 A1 | 1/2003 | Walker et al. | |
| 2004/0180712 A1 | 9/2004 | Forman et al. | |

(Continued)

*Primary Examiner* — Milap Shah

(74) *Attorney, Agent, or Firm* — Miller, Matthias & Hull LLP

(57) ABSTRACT

A gaming device may be modified in a way that is aimed at the similar interests in a focus group rather than on an individual. Groups are formed where the patrons in the groups have related elements. The related elements are compared to modifiable elements of the gaming device and modifications are made to the modifiable elements to attract the members of the focus group.

20 Claims, 18 Drawing Sheets

(56) References Cited

U.S. PATENT DOCUMENTS

| | | |
|---|---|---|
| 2005/0043092 A1 | 2/2005 | Gauselmann |
| 2005/0170890 A1 | 8/2005 | Rowe et al. |
| 2005/0277469 A1 | 12/2005 | Pryzby et al. |
| 2008/0045317 A1* | 2/2008 | Seelig et al. .................... 463/20 |
| 2009/0124376 A1* | 5/2009 | Kelly et al. .................... 463/29 |
| 2009/0191955 A1* | 7/2009 | Seelig et al. .................... 463/25 |
| 2009/0270170 A1* | 10/2009 | Patton .......................... 463/36 |
| 2011/0081961 A1 | 4/2011 | Gagner et al. |
| 2011/0111864 A1 | 5/2011 | Englman et al. |
| 2011/0183749 A1* | 7/2011 | Allen et al. ..................... 463/25 |
| 2012/0021814 A1* | 1/2012 | Gurovich et al. ............... 463/16 |
| 2012/0036020 A1* | 2/2012 | Flinn et al. ................. 705/14.66 |
| 2012/0142429 A1* | 6/2012 | Muller ........................... 463/42 |
| 2013/0017885 A1* | 1/2013 | Englman et al. ................ 463/25 |
| 2013/0040730 A1* | 2/2013 | Barclay et al. ................. 463/27 |

* cited by examiner

| No. | game | suggestion |
|---|---|---|
| 1. | G1 | Volume Up |
| 2. | G2 | Change to Monopoly, volume up |
| 3. | G3 | Change to Monopoly, volume up |
| 4. | G4 | Change to Monopoly, volume up |
| 5. | G5 | Change to Monopoly, volume up |
| 6. | G6 | no change |
| 7. | G7 | no change |

MODIFYING GAMING DEVICES BASED ON PHYSICAL ATTRIBUTES OF DETERMINED GROUPS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE DISCLOSURE

The present disclosure relates generally to gaming apparatus and methods and, more particularly, to modifying gaming devices to appeal to a group.

BACKGROUND OF THE DISCLOSURE

Gaming machines, such as slot machines, video poker machines and the like, have been a cornerstone of the gaming industry for several years. Generally, the popularity of such machines with patrons is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), patrons are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the patron.

Electronic games are capable of being modified to fit the habits and likes of users. The habits may be known through tracking cards, identifications ids or other manners of identifying a user and storing data related to the game playing habits of the user. This habit based data may be used to modify the games in a variety of ways, from the games available to the speed of play.

At times, groups of similar people may be near a gaming device. While each player may have individual habits and likes, the mentality and behavior of a group is often overlooked. Group behavior may be capable of influencing players to play in a manner that is more desirable to a game operator. Further, player enjoyment and user experience may be enhanced if the player is part of a group.

SUMMARY OF THE DISCLOSURE

A gaming device may be modified in a way that is aimed at the similar interests in a focus group rather than on an individual. According to one aspect, a computer-implemented method in a gaming system comprises identifying a group in a variety of ways. In some embodiments, members are identified by sensory devices and in other embodiments, user ids may be obtained that identify the user. Data relating to elements of interest to the user may be obtained from a database. The base group may be reviewed to identify a group of players with similar traits. The games in a sufficiently similar location may then modify elements of the game experience to appeal to the nearby group based on the elements of interest for the group. As a result, games may be modified to appeal to a group of people, not just individuals.

According to yet another aspect of the disclosure, computer readable storage media is encoded with instructions for directing a gaming system to perform the above methods.

Additional aspects of the disclosure will be apparent to those of ordinary skill in the art in view of the detailed description of various embodiments, which is made with reference to the drawings, a brief description of which is provided below.

Figure 1A:
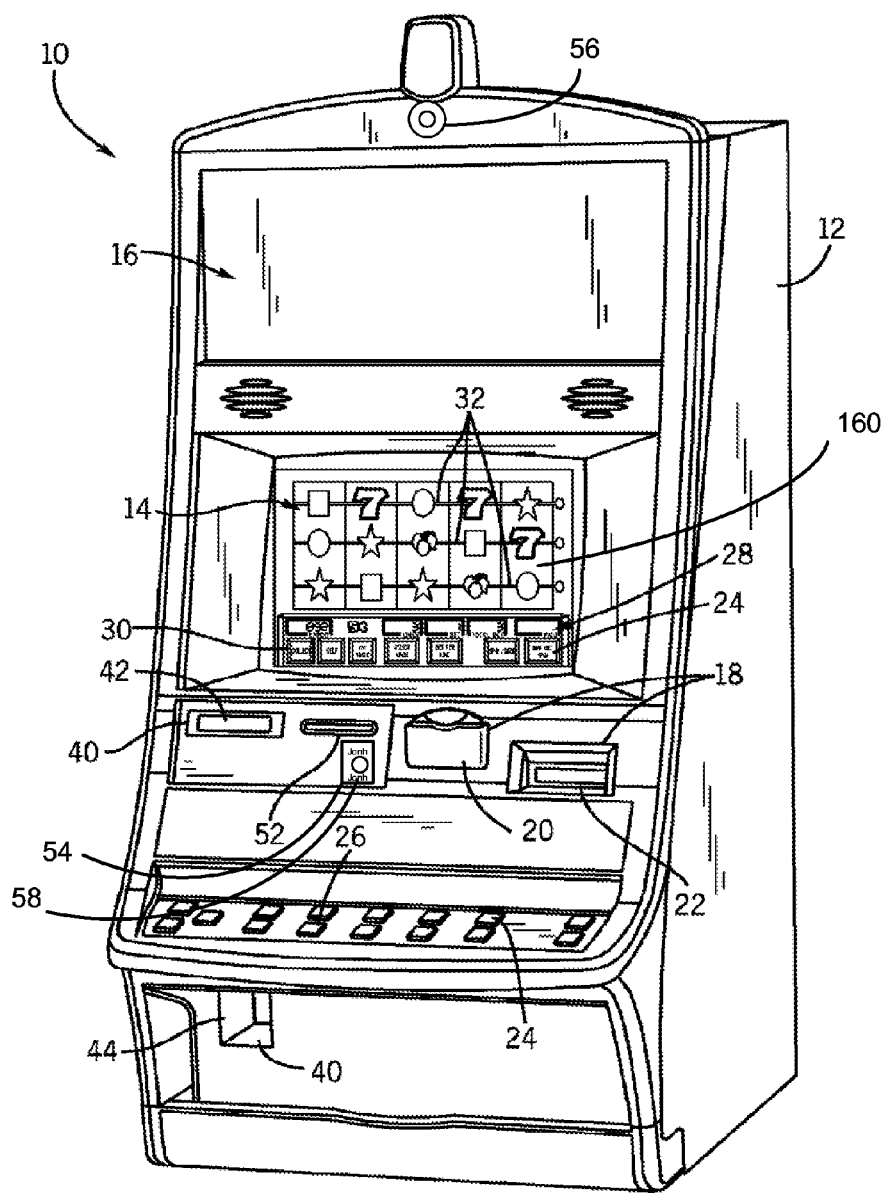
FIG. 1a is a perspective view of a free standing gaming machine.

While the disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the appended claims.

DETAILED DESCRIPTION

While this disclosure is susceptible of embodiment in many different forms, there is shown in the drawings and will herein be described in detail preferred embodiments of the disclosure with the understanding that the present disclosure is to be considered as an exemplification of the principles of the disclosure and is not intended to limit the broad aspect of the disclosure to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1a, a gaming machine 10 is illustrated that may be used in gaming establishments such as casinos. The gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as slots, keno, poker, blackjack, roulette, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming machine 10 may include a housing 12 and may include input devices, including a value input device 18 and a player input device 24. For output, the gaming machine 10 may include a primary display 14 for displaying information about the basic wagering game. The primary display 14 may also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 may receive currency and/or credits that may be inserted by a patron. The value input device 18 may include a coin acceptor 20 for receiving coin currency (see FIG. 1a). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 may include a plurality of push buttons 26 on a button panel for operating the gaming machine 10. In addition, or alternatively, the player input device 24 may include a touch screen 28 mounted by adhesive, tape, or the like over the primary display 14 and/or secondary display 16. The touch screen 28 may include soft touch keys 30 denoted by graphics on the underlying primary display 14 and may be used to operate the gaming machine 10. The touch screen 28 may provide players with an alternative method of input. A player may enable a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game. In some embodiments, a physical player sensor 56 may also be included. The physical player sensor 56 may be a camera or a biometric sensor or a motion detecting device. The physical player sensor 56 may be used to provide inputs to the game, such as images, selection motions, biometric data and other physical information.

The various components of the gaming machine 10 may be connected directly to, or contained within, the housing 12, as seen in FIG. 1a, or may be located outboard of the housing 12 and connected to the housing 12 via a variety of different wired or wireless connection methods. Thus, the gaming machine 10 may include these components whether housed in the housing 12, or outboard of the housing 12 and connected remotely.

The operation of the basic wagering game may be displayed to the player on the primary display 14. The primary display 14 may also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 may include the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 may be slanted at about a thirty-degree angle toward the player of the gaming machine 10.

A player may begin play of the basic wagering game by making a wager via the value input device 18 of the gaming machine 10. A player may select play by using the player input device 24, via the buttons 26 or the touch screen keys 30. The basic game may include of a plurality of symbols arranged in an array, and may include at least one payline 32 that indicates one or more outcomes of the basic game. Such outcomes may be randomly selected in response to the wagering input by the player. At least one of the plurality of randomly-selected outcomes may be a start-bonus outcome, which may include any variations of symbols or symbol combinations triggering a bonus game.

In some embodiments, the gaming machine 10 may also include a player information reader 52 that allows for identification of a player by reading a card 54 with player information 58 indicating his or her true identity. The player information reader 52 is shown in FIG. 1a as a card reader, but may take on many forms including a ticket reader, bar code scanner, RFID transceiver or computer readable storage medium interface. Currently, identification 58 may be generally used by casinos for rewarding certain players with complimentary services or special offers. For example, a player may be enrolled in the gaming establishment's loyalty club and may be awarded certain complimentary services as that player collects points in his or her player-tracking account. The player may insert his or her card 54 into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to recall or restore game assets that the player achieved and saved during a previous game session either in the gaming establishment or on a separate computing device at a different location.

Figure 1B:
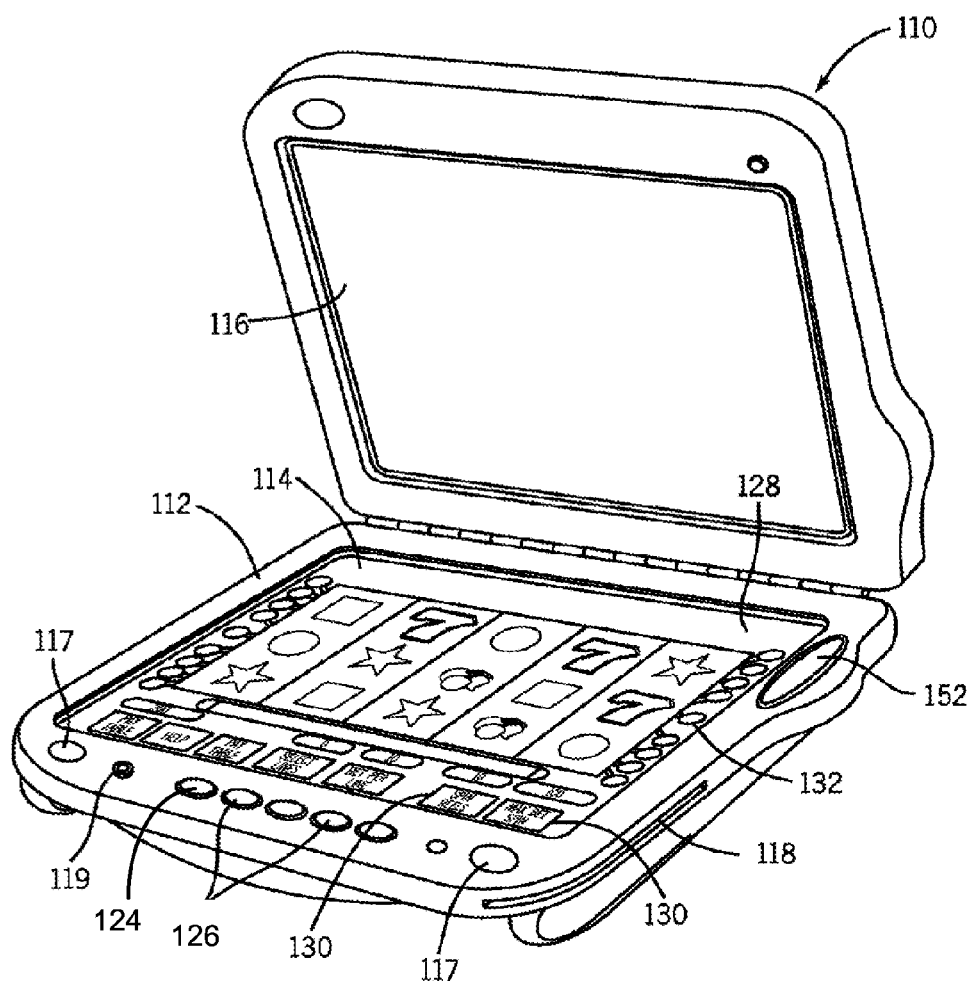
FIG. 1b is a perspective view of a handheld gaming device embodying the present claims.

Depicted in FIG. 1b is one embodiment of the many embodiments of a handheld or mobile gaming machine 110. Like the free standing gaming machine 10, the handheld gaming machine 110 may be an electronic gaming machine configured to play a video casino game such as, but not limited to, slots, keno, poker, blackjack, and roulette. The handheld gaming machine 110 may include a housing or casing 112 and may include input devices, including a value input device 118 and a player input device 124. For output, the handheld gaming machine 110 may include, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1b, the handheld gaming machine 110 may include a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may include, for example, a slot located on the front, side, or top of the casing 112 configured to receive credit from a stored-value card (e.g., casino card, smart card, debit card, credit card, etc.) inserted by a player. In another aspect, the player-accessible value input device 118 may include a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which may transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself include or utilize a biometric player information reader which permits the player to access available funds on a player's account, either alone or in combination with another of the aforementioned player-accessible value input devices 118. In an embodiment wherein the player-accessible value input device 118 include a biometric player information reader, transactions such as an input of value to the handheld device, a transfer of value from one player account or source to an account associated with the handheld gaming machine 110, or the execution of another transaction, for example, may all be authorized by a biometric reading, which may include a plurality of biometric readings, from the biometric device.

Alternatively, to enhance security, a transaction may be optionally enabled only by a two-step process in which a secondary source confirms the identity indicated by a primary source. For example, a player-accessible value input device 118 may include a biometric player information reader which may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) may be utilized to provide enhanced security prior to the electronic transfer of any funds. In another aspect, the value input device 118 may be provided remotely from the handheld gaming machine 110.

The player input device 124 may include a plurality of push buttons on a button panel for operating the handheld gaming machine 110. In addition, or alternatively, the player input device 124 may include a touch screen 128 mounted to a primary display 114 and/or secondary display 116. In one aspect, the touch screen 128 may be matched to a display screen having one or more selectable touch keys 130 selectable by a user's touching of the associated area of the screen using a finger or a tool, such as a stylus pointer. A player may enable a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1b, or may be located outboard of the casing 112 and connected to the casing 112 via a variety of hardwired (tethered) or wireless connection methods. Thus, the handheld gaming machine 110 may include a single unit or a plurality of interconnected parts (e.g., wireless connections) which may be arranged to suit a player's preferences.

The operation of the basic wagering game on the handheld gaming machine 110 may be displayed to the player on the primary display 114. The primary display 114 may also display the bonus game associated with the basic wagering game. The primary display 114 may take the form of a high resolution LCD, a plasma display, an LED, or any other type of display suitable for use in the handheld gaming machine 110. In some embodiments, the gaming machine 110 may be provided as a portable phone, portable gaming console, or other specific or multi-purpose hand-held device, in which case the primary display 114 may be the display provided with such a device. The size of the primary display 114 may vary from, for example, about a 2-3" display to a 15" or 17" display. In at least some embodiments, the primary display 114 may be a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3) and the aspect ratio may be modified depending on the game and use of the device. The primary display 114 and/or secondary display 116 may also each have different resolutions, different color schemes, and different aspect ratios.

As with the free standing gaming machine 10, a player may begin play of the basic wagering game on the handheld gaming machine 110 by making a wager (e.g., via the value input device 118 or an assignment of credits stored on the handheld gaming machine via the touch screen keys 130, player input device 124, or buttons 126) on the handheld gaming machine 110. In at least some aspects, the basic game may include a plurality of symbols arranged in an array, and includes at least one payline 132 that indicates one or more outcomes of the basic game. Such outcomes may be randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card 54 (FIG. 1a) with information indicating the player's identity (e.g., reading a player's credit card, player ID card, smart card, etc.). The player information reader 152 may alternatively or also include a bar code scanner, RFID transceiver or computer readable storage medium interface. In one embodiment, the player information reader 152, shown by way of example in FIG. 1b, may include a biometric sensing device.

Figure 2A:
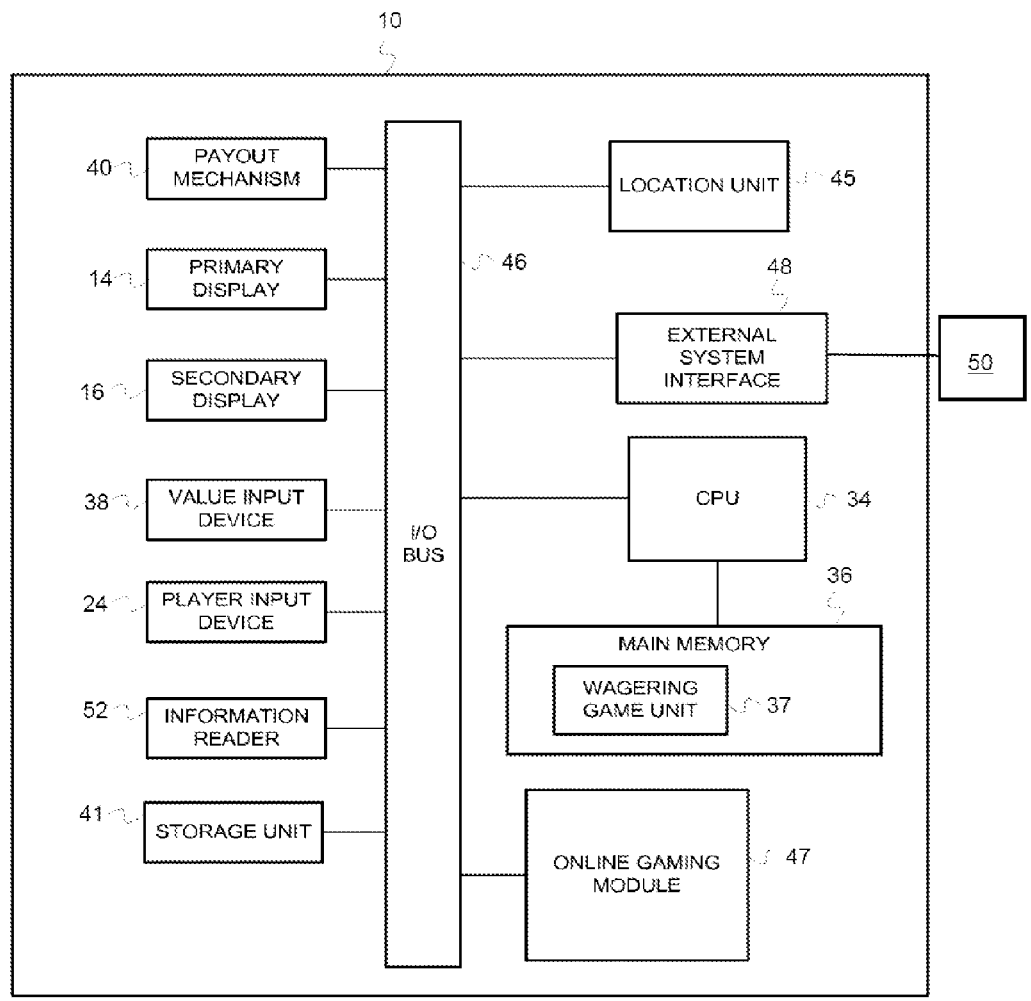
FIG. 2a is a block diagram of a control system suitable for operating the gaming machines of FIGS. 1a and 1b.

Turning now to FIG. 2a, the various components of the gaming machine 10 may be controlled by a central processing unit (CPU) 34, also referred to herein as a controller or processor (such as a microcontroller or microprocessor). To provide gaming functions, the controller 34 may execute (or be physically configured according to) one or more game programs stored in a computer readable storage medium, in the form of memory 36. The controller 34 may perform the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It may be appreciated that the controller 34 may include one or more microprocessors, including but not limited to a master processor, a slave processor, and a secondary or parallel processor.

The controller 34 may also be coupled to the system memory 36 and a money/credit detector 38. The system memory 36 may include a volatile memory (e.g., a random-access memory (RAM)) and a non-volatile memory (e.g., an EEPROM). The system memory 36 may include multiple RAM and multiple program memories. The money/credit detector 38 may signal the processor that money and/or credits have been input via the value input device 18, 118. These components may be located within the housing 12, 112 of the gaming machine 10, 110, or, as explained above, may be located outboard of the housing 12 and connected to the remainder of the components of the gaming machine 10 via a variety of different wired or wireless connection methods.

Turning now to FIG. 2a, the various components of the gaming machine 10 may be controlled by a central processing unit (CPU) 34, also referred to herein as a controller or processor (such as a microcontroller or microprocessor). The controller 34 may include any suitable processor, such as an Intel® processor, AMD processor, or UltraSPARC processor. To provide gaming functions, the controller 34 may execute (or be physically configured according to) one or more game programs stored in a computer readable storage medium, in the form of a main memory 36. The main memory 36 may include a volatile memory (e.g., a random-access memory (RAM)) and a non-volatile memory (e.g., an EEPROM). The main memory 36 may include multiple RAM and multiple program memories. The main memory 36 may further include a wagering game unit 37. In some embodiments, the wagering game unit 37 may present wagering games, such as video poker, video black jack, video slots, video lottery, reel slots, etc., in whole or in part.

The controller 34 may perform the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It may be appreciated that the controller 34 may include one or more microprocessors, including but not limited to a master processor, a slave processor, and a secondary or parallel processor.

The controller 34 may also be coupled to a value input device 38. The value input device 38 may signal the processor that money and/or credits have been input via the value input device 18, 118. These components may be located within the housing 12, 112 of the gaming machine 10, 110, or, as explained above, may be located outboard of the housing 12 and connected to the remainder of the components of the gaming machine 10 via a variety of different wired or wireless connection methods.

As seen in FIG. 2a, the controller 34 may be also connected to, and controls, the primary display 14, the player input device 24, a payout mechanism 40, and a storage unit 41. The payout mechanism 40 may be operable in response to instructions from the controller 34 to award a payout to the player in response to certain winning outcomes that might occur in the basic game or the bonus game(s). The payout may be provided in the form of points, bills, tickets, coupons, cards, etc. For example, in FIG. 1a, the payout mechanism 40 may include both a ticket printer 42 and a coin outlet 44. However, any of a variety of payout mechanisms 40 well known in the art may be implemented, including cards, coins, tickets, smartcards, cash, etc. The payout amounts distributed by the payout mechanism 40 may be determined by one or more pay tables stored in the main memory 36.

An input/output ("I/O") bus 46 may provide communications between the controller 34 and the peripheral components of the gaming machine. The I/O bus 46 may include any suitable bus technologies, such as an AGTL+ frontside bus and a PCI backside bus. More specifically, the controller 34 may control and receive inputs from the peripheral components of the gaming machine 10 through the I/O bus 46. The I/O bus 46 also may be connected to an external system interface 48, which in turn is connected to external systems 50. The external systems 50 may include a gaming network, other gaming machines, a gaming server, communications hardware, or a variety of other interfaced systems or components. The controller 34 may communicate with the external systems 50 via the external system interface 48 and a communication path (e.g., serial, parallel, IR, RC, 10bT, etc.) The external system interface 48 may include logic for exchanging information over wired and wireless networks (e.g., 802.11g transceiver, Bluetooth transceiver, Ethernet transceiver, etc.). Although the I/O bus 46 and external system interface 48 may be illustrated as single blocks, it should be appreciated that each may include a number of different types of I/O circuits.

The I/O bus 46 further may be connected to a location unit 45. The location unit 45 may create player information that indicates the wagering game machine's location/movements in a casino. In some embodiments, the location unit 45 includes a global positioning system (GPS) receiver that can determine the wagering game machine's location using GPS satellites. In other embodiments, the location unit 45 may include a radio frequency identification (RFID) tag that can determine the wagering game machine's location using RFID readers positioned throughout a casino. Some embodiments can use GPS receivers and RFID tags in combination, while other embodiments may use other suitable methods for determining the wagering game machine's location. Although not shown in FIG. 2a, in some embodiments the location unit 45 is not connected to the I/O bus 46.

In some embodiments, the wagering game machine 10 may include an online gaming module 47. The online gaming module 47 may process communications, commands, or other information, where the processing may control and present online wagering games.

Controller 34, as used herein, may include any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may include one or more controllers or processors. In FIG. 2a, the controller 34 in the gaming machine 10 is depicted as comprising a CPU, but the controller 34 may alternatively include a CPU in combination with other components, such as the I/O bus 46, the external system interface 48, and the main memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine 10, 110 may operate primarily as a display device 14 to display the results of gaming outcomes processed externally, for example, on a server as part of the external systems 50, which may be an external computing device 50 or a "cloud" of computing devices that communicate and work together. In this "thin client" configuration, the server 50 executes game code and determines game outcomes (e.g., with a random number generator), while the controller 34 on board the gaming machine 10, 110 processes display information to be displayed on the display(s) 14, 16, 114, 116 of the machine 10, 110.

In an alternative "rich client" configuration, the server 50 determines game outcomes, while the controller 34 on board the gaming machine 10, 110 executes game code and processes display information to be displayed on the display(s) 14, 16, 114, 116 of the machines. In yet another alternative "thick client" configuration, the controller 34 on board the gaming machine 10, 110 executes game code, determines game outcomes, and processes display information to be displayed on the display(s) 14, 16, 114, 116 of the machine. Numerous alternative configurations are possible such that the aforementioned and other functions may be performed onboard or external to the gaming machine 10, 110 as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Wagering Game System Architecture

Figure 2B:
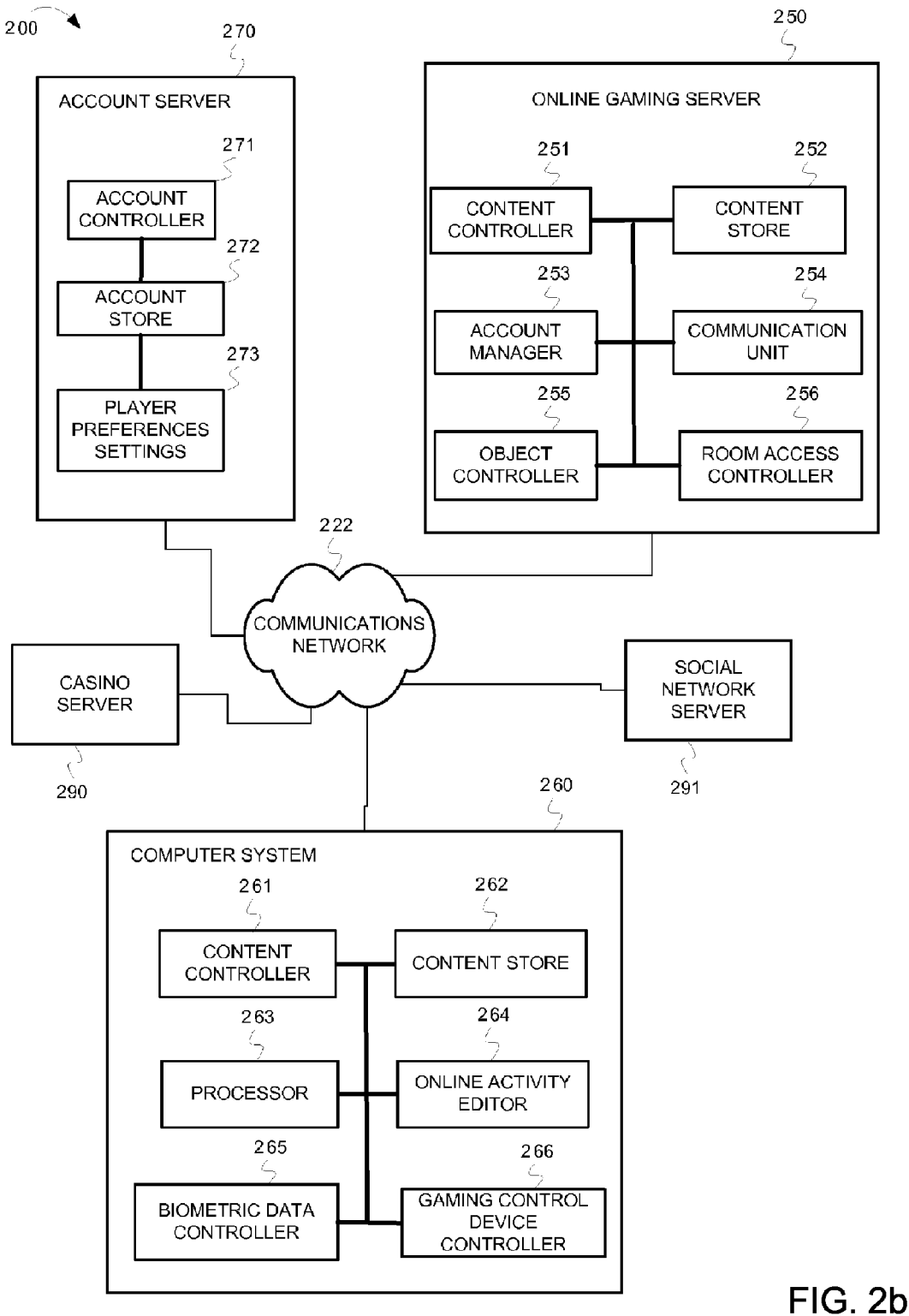
FIG. 2b is an illustration of system architecture that may be used by the system.

FIG. 2b is a conceptual diagram that illustrates an example of a wagering game system architecture 200, according to some embodiments. The wagering game system architecture 200 may include an account server 270 configured to control user related accounts accessible via wagering game networks and social networks. The account server 270 may store and track player information 60 such as identifying information 58 (e.g., avatars, screen name, account identification numbers, etc.) or other information like financial account information, social contact information, etc. The account server 270 may contain accounts for social contacts referenced by the player account. The account server 270 may also provide auditing capabilities, according to regulatory rules, and track the performance of players, machines, and servers.

The account server 270 may include an account controller 271 configured to control information for a player's account. The account server 270 may also include an account store 272 configured to store information for a player's account. The account server 270 may also include a player preferences settings 273 configured to store settings associated with actions, skins, behaviors, multi-media files, music, and other information with a player account's indicated expressions of emotion, and/or a system imposed expression of an emotion, for an avatar or other object within the online gaming venue. The player preferences settings 273 may communicate information to an object controller 255 to apply the information stored in the settings to an avatar object associated with the player account.

The wagering game system architecture 200 may also include an online gaming server 250 configured to control wagering game content, provide random numbers, and communicate wagering game information, account information, and other information to and from a computer system 260. The online gaming server 250 may include a content controller 251 configured to manage and control content for the presentation of content on the computer system 260. For example, the content controller 251 may generate game results (e.g., win/loss values), including win amounts, for games played on the computer system 260. The content controller 251 may communicate the game results to the computer system 260. The content controller 251 may also generate random numbers and provide them to the computer system 260 so that the computer system 260 may generate game results.

The online gaming server 250 may also include a content store 252 configured to contain content to present on the computer system 260. The online gaming server 250 may also include an account manager 253 configured to control information related to player accounts. For example, the content controller 251 may communicate wager amounts, game results amounts (e.g., win amounts), bonus game amounts, etc., to the account server 270. The online gaming server 250 may also include a communication unit 254 configured to communicate information to the computer system 260 and to communicate with other systems, devices and networks. For example, the communication unit 254 may track and communicate with community wagering game servers, account servers, community servers, social networking servers, file sharing servers, etc. The online gaming server 250 may also include the object controller 255 configured to control position, movements, actions, functions, etc. of online gaming objects. The online gaming server 250 may also include a room access controller 256 configured to control access to online gaming venue rooms, including security and access levels based on player settings, player status, etc.

The wagering game system architecture 200 may also include the computer system 260 configured to present wagering games and receive and transmit information to control and present online wagering games. The computer system 260 may include a content controller 261 configured to manage and control content and presentation of online gaming venue content on the computer system 260. The computer system 260 may also include a content store 262 configured to contain content to present on the computer system 260. The computer system 260 may also include a processor 263 configured to process wagering game content, present online wagering game objects, control gaming devices, etc.

The computer system 260 may also include an online activity editor 264 configured to record, modify, and share recorded online gaming activity. The online activity editor 264 may be further configured to add comments, text, pictures and other multi-media modifications to the recorded online gaming activity files. The online activity editor 264 may share the recorded online gaming activity with other player accounts. The computer system 260 may also include a biometric data controller 265 configured to detect biometric data from one or more sensors and equipment 56 attached to the computer system and transfer the data to the object controller to express one or more indications of emotions by a player account. The computer system 260 may also include a gaming control device controller 266 configured to detect and control devices, including a gaming pad, custom player control devices, login devices, etc. The gaming pad, for example, may be configured to move an avatar within the online gaming venue in a very fluid motion, much more fluidly than possible with a standard keyboard.

The wagering game system architecture 200 may also include a casino server 290 configured to provide wagering game content and control information for wagering games. The wagering game system architecture 200 may also include a social network server 291 configured to provide social network content and social network account information.

Each component shown in the wagering game system architecture 200 is shown as a separate and distinct element connected via a communications network 222. However, some functions performed by one component may be performed by other components. For example, the online gaming server 250 may also be configured to gather and store biometric data, record and store online gaming activity, transfer shared files between player accounts, etc. The components shown may all be contained in one device, but some, or all, may be included in, or performed by multiple devices, or other configurations not shown.

Furthermore, the wagering game system architecture 200 may be implemented as software, hardware, any combination thereof, or other forms of embodiments not listed. For example, any of the network components (e.g., the wagering game machines, servers, etc.) may include hardware and machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Thus, in some embodiments, the computing device 10 may be a dedicated gaming device such as a video gaming device 10 in a casino. The video gaming device 10 may execute the gaming computer code locally or the video gaming device may be a thought of as a node on a network where one or more servers, which may be local or remote, may execute code and the video signal may be communicated to the computing device 10. In other embodiments, the gaming device may be a computing device 10 in a user's home such as a personal computer. The processor 34 in the computing device 10 may be physically configured to execute the code or the personal computer. In other embodiments, the computing device 10 may be thought of as a node on a network where a server is physically configured according to the gaming computing instructions. In yet another embodiment, the gaming device may be a portable computing device 110. The portable computing device 110 may be physically configured to execute the gaming code or the portable computing device 110 may be in communication with a server that executes some or all of the gaming code and communicates images to be displayed. In all the embodiments, the gaming device 10, 110 may communicate with a central authority that may track game play, awards, likes, dislikes, etc., assuming sufficient permission is obtained. The communication may be wired or wireless and the communication may be secured in a manner to ensure the integrity of the game and the player private information is maintained. In addition, the game may operate on a variety of platforms, from an operating system on a PC to a social media application on a portable computing device 110 platform to a gaming console 10 platform.

Security features are advantageously utilized where the gaming machines 10, 110 communicate wirelessly with external systems 50, such as through wireless local area network (WLAN) technologies, wireless personal area networks (WPAN) technologies, wireless metropolitan area network (WMAN) technologies, wireless wide area network (WWAN) technologies, or other wireless network technologies implemented in accord with related standards or protocols (e.g., the Institute of Electrical and Electronics Engineers (IEEE) 802.11 family of WLAN standards, IEEE 802.11i, IEEE 802.11r (under development), IEEE 802.11w (under development), IEEE 802.15.1 (Bluetooth), IEEE 802.12.3, etc.). For example, a WLAN in accord with at least some aspects of the present concepts may include a robust security network (RSN), a wireless security network that allows the creation of robust security network associations (RSNA) using one or more cryptographic techniques, which provides one system to avoid security vulnerabilities associated with IEEE 802.11 (the Wired Equivalent Privacy (WEP) protocol). Constituent components of the RSN may include, for example, stations (STA) (e.g., wireless endpoint devices such as laptops, wireless handheld devices, cellular phones, handheld gaming machine 110, etc.), access points (AP) (e.g., a network device or devices that allow(s) an STA to communicate wirelessly and to connect to a(nother) network, such as a communication device associated with I/O circuit(s) 48), and authentication servers (AS) (e.g., an external system 50), which provide authentication services to STAs. Information regarding security features for wireless networks may be found, for example, in the National Institute of Standards and Technology (NIST), Technology Administration U.S. Department of Commerce, Special Publication (SP) 800-97, ESTABLISHING WIRELESS ROBUST SECURITY NETWORKS: A GUIDE TO IEEE 802.11, and SP 800-48, WIRELESS NETWORK SECURITY: 802.11, BLUETOOTH AND HANDHELD DEVICES, both of which are incorporated herein by reference in their entirety.

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Figure 3:
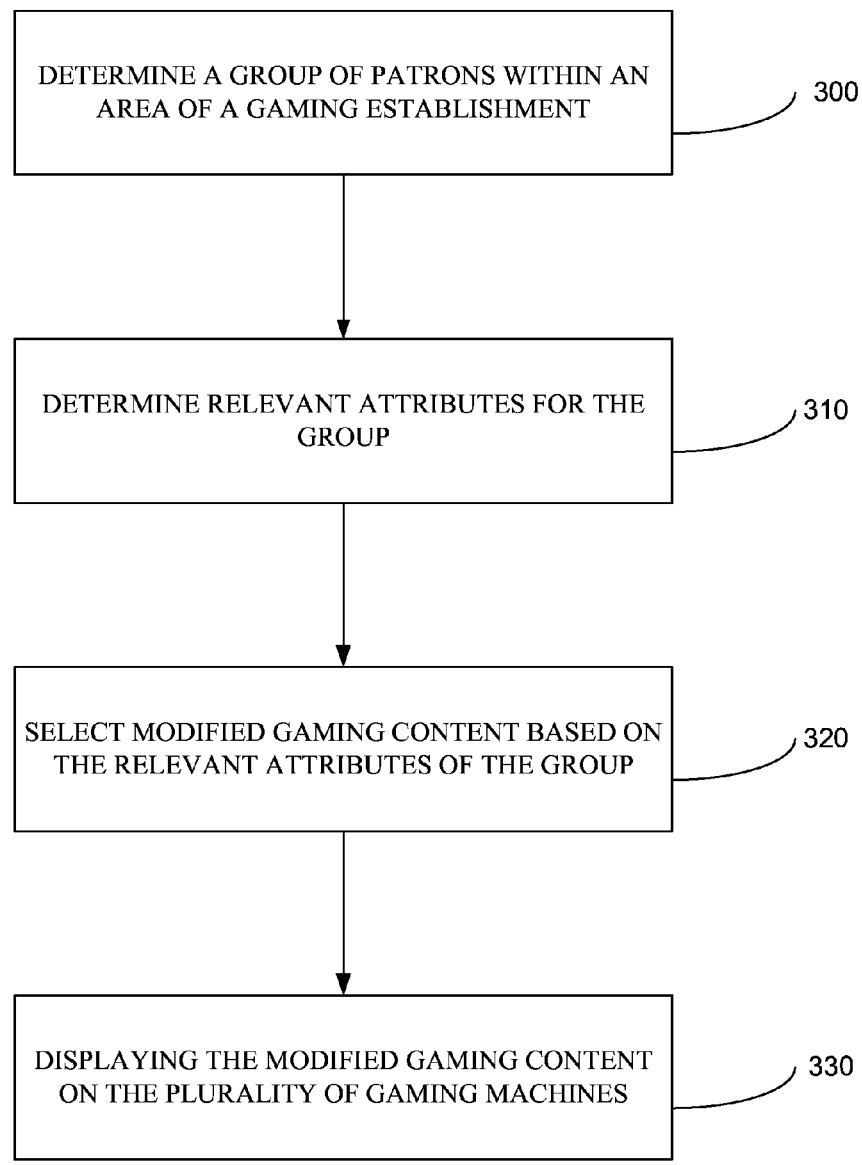
FIG. 3 is an illustration of a manner of presenting gaming content to a group.

FIG. 3 may illustrate one embodiment of a method of displaying content determined to be relevant to a group of patrons in a geographic area such as a casino floor. At block 300, a group of patrons within an area of a gaming establishment may be determined. Patrons may simply be people walking through a floor of a casino and may not be playing a game. As will be explained further, FIG. 3 will discuss a casino floor with gaming devices but the area may not be limited to just a casino floor. What is a related location 910 (FIG. 10) may depend on a variety of factors. In one embodiment and not limitation, the related location 910 may be a defined geographic area, such as an area in a gaming establishment such as a casino. In other embodiments, the defined geographical area may be much larger, especially where players are playing at home, are using portable computing devices 110 or there are few players playing which may make it more difficult to find players nearby. The term "area" is not meant to be limiting as "area" historically may have meant a physical location of a casino. The term "area" as used herein may be broader than just the physical location of a casino.

Location

The location of the patrons may be determined in a variety of ways. For example, the location may be determine using at least one of the location unit 45, player tracking cards 54, visual analysis, floor sensors, Wi-Fi, GPS and cell phone triangulation. In some embodiments, players may be in a gaming establishment and may use player tracking devices such as player tracking cards 54. In these situations, it may be especially easy to establish the location of a group of players as the location may be registered through the player tracking cards 54. In some embodiments, the cards may have RFIDs which may be tracked. Further, visual analysis, floor sensors, Wi-Fi, GPS and cell phone signal analysis may be used to determine patron locations. In yet another embodiment, a mobile computing device 110 may be used to help track the location of the player. For example, the identifier of a cell phone may be tied to a user and the path of that user may be tracked through the gaming establishment.

Gaming establishments may determine the location of patrons by tracking the location of a mobile computing device 110 or a mobile computing device 110 of a patron or a player tracking card 54 that has the capability to be physically tracked. If the device has Global navigation satellite systems (GPS or GNSS) capabilities, GPS may be used to determine a location. However, GPS does not work in all locations. GNSS are generally not suitable to establish indoor locations, since microwaves will be attenuated and scattered by roofs, walls and other objects. However, in order to make positioning signals that may be obtained everywhere (ubiquitous), integration between GPS and indoor positioning may be used.

Currently, GNSS receivers are becoming more and more sensitive due to continuing progress in chip technology and processing power. High Sensitivity GNSS receivers are able to receive satellite signals in more and more indoor environments and attempts to determine the 3D position indoors are improving. However, proper coverage for the required for satellites to locate a receiver is not achieved with all current designs for indoor operations.

Other wireless technologies may be used by gaming establishments for locating wireless devices and the people using them, so many systems take advantage of existing infrastructure. Others provide increased accuracy at the expense of costly equipment and installations. A simple concept of location indexing and presence reporting for tagged objects uses known sensor identification only such as RFIDs. Operability of such approaches requires some narrow passage to prevent from passing by out of range.

Grid Concepts

Instead of long range measurement, a dense network of low-range receivers may be arranged, e.g. in a grid pattern for economy, throughout the gaming space being observed such as a gaming establishment floor. Due to the low range, a tagged entity may be identified by only a few close, networked receivers. An identified tag must be within range of the identifying reader, allowing a rough approximation of the tag location. Advanced systems combine visual coverage with a camera grid with the wireless coverage for the rough location. The tag may be a player tracking card 54 with an RFID chip or a mobile computing device 110, such as a mobile phone, that may have near field communication (NFC) capabilities.

Long Range Sensor Concepts

Some long range systems use a continuous physical measurement (such as angle and distance or distance only) along with the identification data in one combined signal. Reach for these sensors may cover an entire floor, or an aisle or just a single room. Short reach solutions may get applied with numerous sensors and overlapping reach. An angle of arrival (AoA) is the angle from which a signal arrives at a receiver.

AoA is usually determined by measuring the time difference of arrival (TDOA) between multiple antennas in a sensor array. In other receivers, it is determined by an array of highly directional sensors where the angle can be determined by which sensor received the signal. AoA is usually used with triangulation to find the location relative to two anchor transmitters.

The time of arrival (ToA, also time of flight) is the amount of time a signal takes to propagate from transmitter to receiver. Because the signal propagation rate is constant and known (ignoring differences in mediums), the travel time of a signal can be used to directly calculate distance. Multiple measurements may be combined with trilateration to find a location.

Received signal strength indication (RSSI) is a measurement of the power level received by sensor. Because radio waves propagate according to the inverse-square law, distance can be approximated based on the relationship between transmitted and received signal strength (the transmission strength is a constant based on the equipment being used), as long as no other errors contribute to faulty results. The inside of buildings is not free space, so accuracy is significantly impacted by reflection and absorption from walls. Non-stationary objects such as doors, furniture, and people can pose an even greater problem, as they can affect the signal strength in dynamic, unpredictable ways.

Gaming establishments may also attempt to use enhanced Wi-Fi infrastructure to provide location information. Few of these systems serves for proper operation with "as is" infrastructure as Wi-Fi signal strength measurements are extremely noisy, especially indoors. There is ongoing research focused on making more accurate systems by using statistics to filter out the inaccurate input data. Wi-Fi Positioning Systems are sometimes used outdoors as a supplement to GPS on mobile devices, where only few erratic reflections disturb the results. Others approaches include attempts to use ultrawide band (UWB) sources, infrared sources (IR) (IR was previously included in most mobile devices), visible light communication (VLC) sources which may use existing lighting systems and ultrasound waves which may move very slowly, which may result in higher accuracy.

Of course, cameras, microphones, weight sensors and heat sensors may be used to identify and track patrons. The images from the cameras may be subjected to facial and physical analysis to determine if the patron may be matched to a player tracking ID. Similarly, the microphones may be used to record voices which may be analyzed for matched to known players. The patrons may be given preliminary tracking IDs until the patron may be matched to a player tracking ID data 60 or the player may keep the preliminary tracking ID if an player tracking ID data 60 cannot be matched to the patron. In addition, some or all of these locational methods may be used together to establish a patron location.

Sufficiently Related

Once a location is established, the locations of the patrons may be analyzed determine if the locations are sufficiently related. In the casino example, the sufficiently related location may be near a group of gaming devices 10, 110. For example, if the patrons are in visual or aural contact of a gaming device 10, 110, the patron may be determined to be in a sufficiently related location.

What is a sufficiently similar location may also be determined by a location function. In the embodiment where a scoring function is used, the patrons near the gaming device 10, 110 may be given a high score. In some embodiments, the function may also take into account whether nearby gaming machines 10, 110 are configurable with modifiable elements 160. If the nearby gaming devices have modifiable elements 160, the function may be further weighted toward determining that the players are in a sufficiently similar location. Other factors may also be used by a location function. As an example, in a gaming establishment, there may be many players in a relatively small location (which might be a weight in favor of deciding to place the players as being in a sufficiently similar location) but the players may be separated by a wall or may be in completely different rooms (which may weight against placing the players in sufficiently similar location).

Referring again to FIG. 3, at block 310, related attributes for the group may be determined. The related attributes may be determined in a variety of ways. At a high level, if the patrons have a patron indicating object or recently entered id such as player tracking cards 54 or registered cell phones that may be easily traced to a patron, then the data previously gathered from the patron may be reviewed for common attributes. If the patrons do not have patron indicating objects, the patrons may be attempted to be recognized using visual, aural, biometric or other indications and then the patron data for the recognized patrons may be reviewed for common attributes. Finally, if the patrons are still not recognized, generalizations may be made and attributes related to the generalizations may be reviewed for common attributes.

Related attributes from a group may be determined in a variety of ways when the users in the group have player tracking id 58. Player tracking ids 58 may be obtained from the users in the group. The player tracking ids 58 may be obtained in a variety of ways. In some embodiments, the user may be asked to input the player tracking ids 58. The player tracking id 58 may be an email address, a phone number, a series of digits and or numbers that are unique to the user. In other embodiments, a player tracking card 54 is fed into a card reader or placed in front of a reader and the player tracking id 58 is obtained from the card.

In other embodiments, the player tracking id 58 may be an RF id or other wireless id that provides a unique identifier to a user. The player id 58 may be obtained from the user with virtually no input from the user. For example, an RF reader may be part of the physical sensor 56 and may be placed near a gaming device 10, 110 and the reader may obtain the code, submit it to a database and attempt to find a match.

In yet additional embodiments, the player tracking id 58 is a form of physical unique identification such as a fingerprint or a scan of a cornea. The player may look into a camera 56 or swipe a finger on the touch screen 28 to provide the unique physical input. The scanned data may be compared to data in a database in the hopes that a match may be found.

In yet another additional embodiment, if the user is using a portable 110 or personal computing device 10, player tracking data 58 may be stored on the computing device 10, 110. The data 58 may be stored as a certificate or as an encrypted file. In yet another embodiment, the data 58 may be stored as a cookie that is available to a remote computing device 50.

Figure 4:
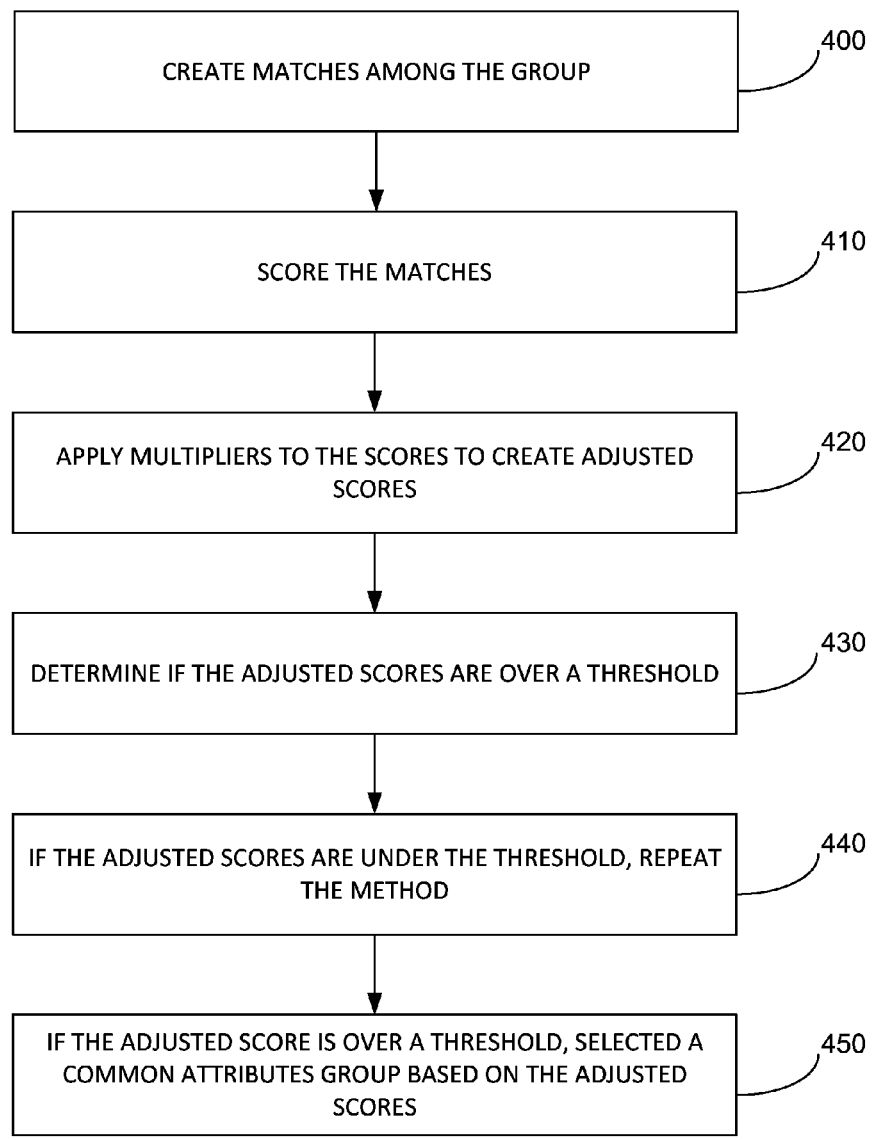
FIG. 4 is an illustration of a manner of scoring elements related to patrons to determine which data may be the most relevant.

The player tracking data 60 (FIG. 14) for the users in the group may be analyzed to find related data. Player tracking data 60 may include a large variety of data ranging from favorite games to preferred sound levels. The analysis may entail using a scoring function to determine the best related data. FIG. 4 describes one manner out of the many manners of scoring elements related to players to determine which data may be the most relevant.

In some embodiments, the comparison of the user data may 60 be given confidence scores. The confidence scores may indicate the predicted relevance of the user elements. For example, a confidence score of a group of men that wear similar hats such as NY Jets hats, being related may be high. At the same time, the confidence score of a group of women that wear earrings may be low as virtually all women wear earrings and there is nothing special that would indicate confidence that the women in earrings share related attributes. The scoring may be based on a formula that provides confidence scores of the different physical aspects that would indicate the users have similar attributes.

At block 400, matches of attributes among group may be created. In some embodiments, player tracking data 60 may be sorted into categories and the data in each category may be compared to create matches. As mentioned earlier, the user data 60 may be data from a player tracking card 54, may be physically observed data, may be biometric data or may be a combination of player tracking, physical and biometric data.

At block 410, the matches may be scored. The scores may be an indication of how close the matches are and whether the closeness is especially relevant in view of the scale of relative closeness. For example, some matches may be close but not exact such as, a patron that likes sound as a low volume may be sufficiently similar to a patron that like sound at a soft volume.

At block 420, multipliers may be applied to the scores where multipliers represent predicted relevancy of matches to create adjusted scores. Some matches may be more important than others. Over time, the matches that are more important may be determined through testing such as trial and error and these matches may be stored and given higher multipliers.

At block 430, it may be determine if the adjusted scores are over a threshold. Some attributes of the patrons may not be sufficiently similar to create a useful group of common attributes. By using a threshold, only attributes that are predicted to be sufficiently similar may be created. In this way, groups are only created when there are sufficient links.

At block 440, if the adjusted scores are under the threshold, the method may be repeated. In some embodiments, the method may run virtually continuously, always seeking to create additional groups of patrons with related attributes even after a first or second group has been created. In other embodiments, the method may wait for period of time to create an additional group where a first group already exists. In some embodiments, the system may be able to work on several locations with several groups at once while it tries to create a plurality of groups which may be in different locations.

Further, patrons may be mobile. As an example, a patron may walk through a gaming establishment such as a casino while considering the available games. The patron may stop at a crowd gathered around a game that is generating excitement. As such, the patron may be considered as part of a group that may exist near the game. The patron may then proceed to another part of the casino where additional activity is occurring. The patron may then be considered for any groups near the additional activity. As the patron moves through the casino and the location is known, the patron may be considered to be part of additional groups that may exist throughout the casino.

Patron movement may also affect group limit calculations. For example, say there is a group of ten players for a specified physical location/area (the 'alpha' area) within the casino. Now say one of the patrons within the group decides to leave the 'alpha' area, resulting in only nine players remaining in the group for the 'alpha' area. Because one patron walked outside the 'alpha' area, the reduction in group size may trigger a recalculation of the group. Similarly, a new player could walk into the 'alpha' area, causing a recalculation of the group. In other words, if the membership of the group hits a predefined threshold (high and/or low) of players, the group may be automatically re-calculated (or the casino may be notified that the threshold limits have been reached). Threshold may be based on number of players in the group, minimum/maximum period of time the group has been active, or feature attributes and the thresholds may be modified by an authority and may vary based on the gaming environment.

At block 450, if the adjusted score is over a threshold, common attributes may be selected. The threshold may be set by an authority and may be adjusted. The threshold may vary over time. For example, the threshold may be higher when a gaming establishment is crowded such as on a weekend night and may be lower when the casino is less busy such as on a weekday morning.

No Tracking ID

In some embodiments, the detection of related elements 930 (FIG. 14) of the patrons may include sensing physical characteristics and biometric data. Some sample physical characteristics include player sex, player age, player height, player weight, player hair color, voice, voice pattern, voice volume, player clothing style and the observed game preference. The physical characteristics may be determined using a physical sensor 56 such as a camera or microphone that is in communication with the gaming unit 10, 110 and the images and sounds may be analyzed to create a best guess as to the physical characteristics.

Figure 5:
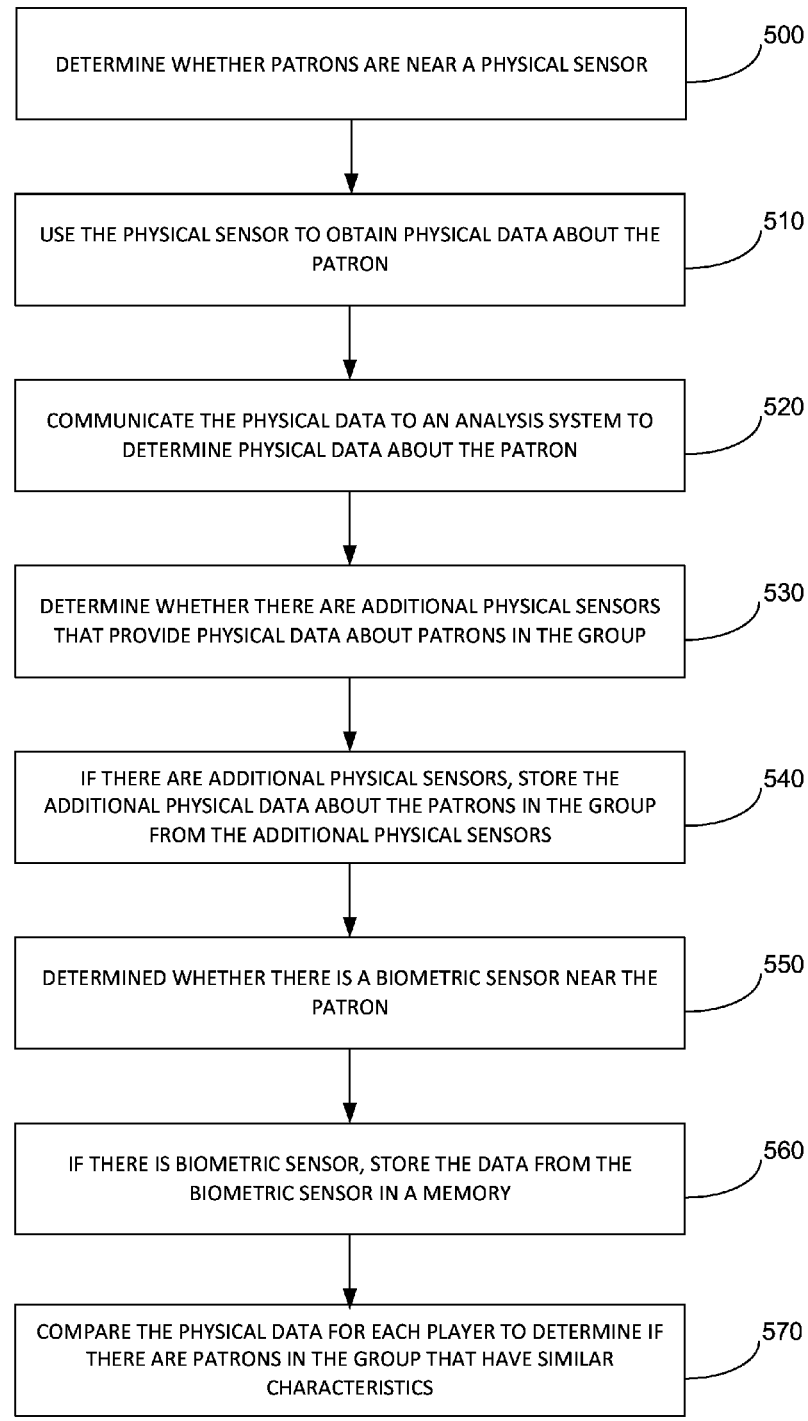
FIG. 5 is an illustration of a manner of determining related elements when a user does not have a patron tracking identification.

FIG. 5 may illustrate one method of determining related elements 930 when a user does not have a player tracking card. At block 500, it may be determined whether patrons in the group are near a physical sensor 56 (FIG. 1*a*). The physical sensor 56 may be a camera, a heat sensor, an inferred camera, a weight sensor, a microphone or any other device that senses physical characteristics of a user. The physical sensor 56 may be part of the gaming device 10, 110 such as a web cam attached to a laptop or may be a separate camera such as a camera in the ceiling of a gaming establishment or on a casino gaming unit 10. The location of physical sensors 56 may be known or may be queried, such as querying a user computing device 10, 110 whether it has a web cam, thus allowing the physical location of nearby objects to be established.

If the user is near a physical sensor 56, at block 510 the physical sensor may 56 be used to obtain physical data about the patron. As an example and not limitation, if the physical sensor 56 is a camera, the camera may be used to take a physical picture of the patron.

In addition, at block 520, the physical data may be communicated to an analysis system and may be analyzed to determine physical data about the patron. A module may review the physical data and may attempt to determine physical characteristic of the user. Some sample physical characteristics include patron sex, patron age, patron height, patron weight, patron hair color, patron clothing style, patron voice, patron voice pattern and the observed game preference. In some instances, the data may be unclear and a scoring system may be used to attempt to make logical guesses or estimates as to the physical characteristics. As an example, the patron may be wearing a winter coat making identification of a patron's weight difficult, however, the patron may be determined to be 6'4" and a weight estimate may be made based on the height and a confidence score may be used to indicate the confidence of the weight estimate.

In addition, there may be a plurality of physical sensors 56 that may be available. For example, there may be a sensing apparatus in the floor of a gaming establishment that may sense physical presence and weight. In addition, there also may be cameras that take images near the sensing apparatus. At block 530, it may be determined whether there are additional physical sensors 56 that may provide physical data about users in the group 900. At block 540, if it is determined that there are additional physical sensors 56, the additional physical data about the patrons in the base group 900 from the additional physical sensors 56 may be stored.

At block 550, it may be determined whether there is a biometric sensor near the patron. In some embodiments, biometric measuring devices may be the physical sensor 56 in communication with the gaming device 10, 110 and may be used to determine biometric information about patrons. Biometric information may include data regarding a patron's mood, level of interest, etc. At block 560, if there is biometric sensor, then the data from the biometric sensor may be stored in a memory.

At block 570, as the observed data is received, the physical data for each patron may be compared to determine if there are recognized patrons. The physical data for known patron may be stored in a database and the observed data may be compared to the observed data. For example, a photo of a patron may be compared to photos of known patrons. If there is a match, the related elements for the known patron may be obtained and used for comparison purposes. A similar attempt to match voice prints to known patrons may be another example.

Generalization

Figure 6:
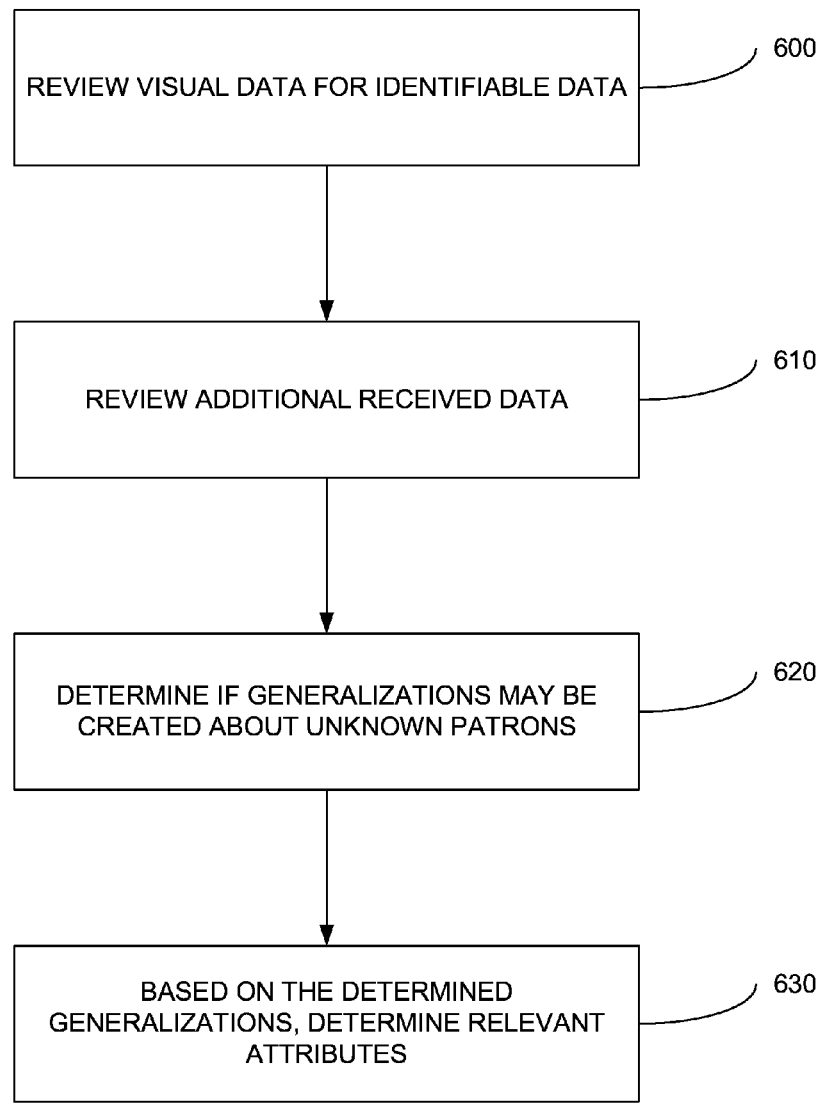
FIG. 6 is an illustration of a manner of identifying related attributes in a group of individuals that cannot be specifically identified.

If the physical data does not have a match, then generalizations about the patron may be made. The generalization may attempt to predict from observed physical data attributes that may be common among the group and that may motivate a patron to play a game. FIG. 6 may be an illustration of a sample method of identifying related attributes in a group of individuals that cannot be specifically identified.

At block 600, visual data may be reviewed for cues that may be identified and stored in one or more files related to that patron. As an example, if there are words that may be identified on patrons clothing, these words may be stored in relation to a file for that patron. Other visual cues may include logo for teams, plays, movies, television shows, etc. Further, physical characteristics may be observed such as height, hair color, facial hair, etc.

At block 610, additional received elements of the patron may be reviewed. Some of the additional elements may include a patron's voice, a patron's pattern of speech, word choice, a patron's language, a patron's scent, a patron's mannerism or any other observable data. Known technology for receiving available data such as microphones and speech to text computer applications may be used to translate the noise into useful information. In addition, physical sensor such as Kinect™ type sensors may use image and sound reflection technology to track movements and translate the movements into useful data.

At block 620, the collected data about the unknown patrons may them be reviewed to see if the data indicates that generalizations may be made about patrons that make up the group. For example, if a majority of patrons speak with a southern accent and some of the patrons are wearing New Orleans Saints gear, then it may be assumed that a related element is that the patrons may enjoy a game related to Marti Gras or New Orleans.

At block 630, the generalizations may be used to determine related attributes for the patrons in the group. Observed physical data may provide clues about related attributes of the members of a group and games may be modified to match the related interests. As an example, patrons observed wearing t-shirts with the Monopoly game logo may like to play the casino version of the game Monopoly. Similarly, patrons that are heard to be talking about the Wizard of Oz may desire to play the casino game of the Wizard of Oz.

Further, the generalization and the suggested related attributes may be modified over time in a trial and error type fashion. Suggested related attributes may be used and the response may be tracked. Over time, the suggested related attributes will continue to improve.

Referring again to FIG. 3, at block 320, game attributes on gaming devices near the group may be modified based on the related attributes of the group. Modern gaming devices, which as previously mentioned, may be casino gaming devices 10, portable computing devices 110, cloud based devices or personal computers 10, may be able to display a variety of games which may be considered attributes of the gaming device 10, 110. In addition, the games may be modified. Specifically, the games may have modifiable game elements 160 which are game attributes which are modifiable such as sound level, brightness, speed of play, game choice, bonus game options, etc.

In the case where the patrons are known either through the player tracking card or through physical identification, the modifications may quickly identified by reviewing the player tracking data which may indicate a variety of patrons likes, such as specific games, denominations, music, sound levels, pay tables, etc. If the player tracking file is lacking any specific likes, or the player is not known, generalizations or educated guesses may be made about suggested related elements that may be used to select content that is believed to be of interest to the players.

Figure 15:
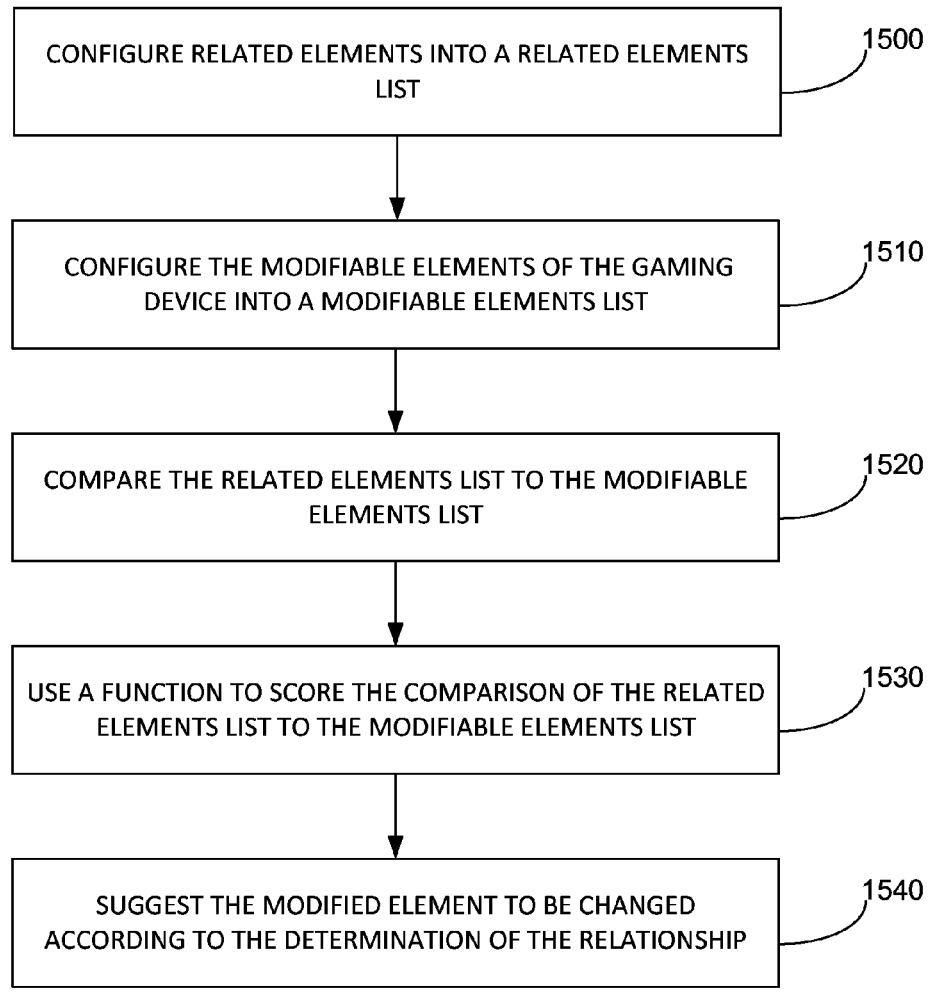
FIG. 15 is an illustration of scoring the relatedness of related elements and modifiable elements in a game.

FIG. 15 may describe one manner of comparing related elements for the group to modifiable elements 160 in the gaming device 10, 110 to determine the desired modification. The related elements may be compared to modifiable elements 160 and the comparison that is the closest may result in the selection of the one or more game modifications to one or more gaming devices 10,110 near the specific group.

The relation of related elements to game modifications may start at a baseline and may be improved over time. Existing player profiles may be used to help create a baseline guess for suggested game modifications. For example, if a majority of music lovers also love games that have musical themes, the gaming devices may be changed to display games with musical themes. As an example, patrons that wear New York Jets hats may not be swayed to play a Wizard of Oz casino game but may be persuade to play if the game is changed to Monopoly which may contain the name of streets in New York. As yet another example, patrons that have just left a rare musical performance may be enticed to play "Life of Luxury Deluxe" slots but may not be interesting in playing "Baron von Bacon" slots as, over time, the system has determined that music performance patrons prefer "Life of Luxury Deluxe" over "Baron von Bacon."

The modifications may be made automatically or may be suggested to an authority. For example, the proposed modifications may be approved by a casino employee. In other embodiments, the proposed modifications may be reviewed by an additional module which may consider the suggested modification in view of the current environment in the gaming establishment.

At block 330, the modified gaming content may be displayed on the gaming devices 10, 110 determined to be near the group if the modification is desired. As mentioned previously, the gaming devices 10, 110 may be modified as determined at block 320. The modification may be electronically communicated and may occur in a timely manner such that the changes will occur while the patrons are still within the relevant vicinity of the gaming units 10, 110.

Figure 7:
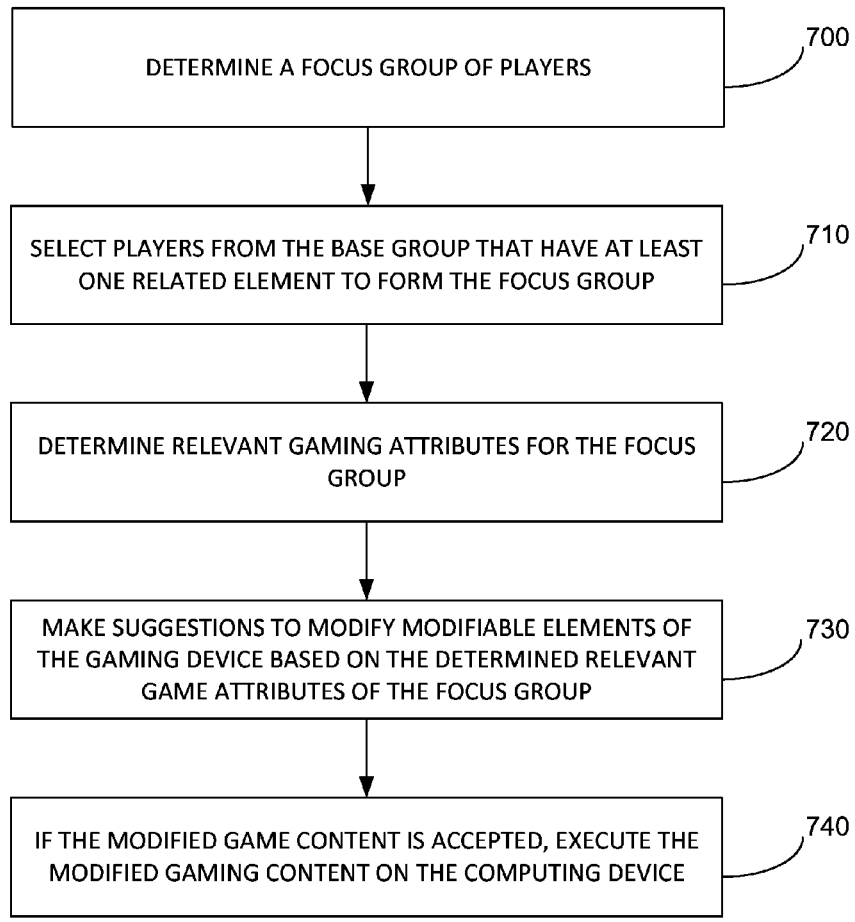
FIG. 7 is an illustration of a manner of presenting gaming content to a group.

FIG. 7 may illustrate an additional method of presenting gaming content on a computing device 10, 110 to a group. In this embodiment, the computing device may be any device and the location may be even more broadly defined. At block 700, a focus group 920 (FIG. 10) of players may be determined. The focus group 920 of players may be determined in a variety of ways. In some embodiments, the focus group 920 may be a group of people near a gaming device in a casino that is considered to be "hot" or where the user is having success. In other embodiments, the focus group 920 may be a number of users in a town that uses computing devices 10,110 to play a game. In yet additional embodiments, the players may use mobile devices and may be related in a way aside from geography, such as being family member, being fans of a particular game, etc.

At a high level, players considered to be in a sufficiently related location 910 may be selected to be part of a base group 900. The base group 900 is then reviewed to determine if there are a sufficient number of players that have similar gaming likes or related elements 930. If the focus group 920 can be created, it may be reviewed to determine how modifiable elements 160 which may be technical elements, in nearby gaming machines 10, 110 may be modified to match the liked elements 930 of the focus group 920.

Figure 8:
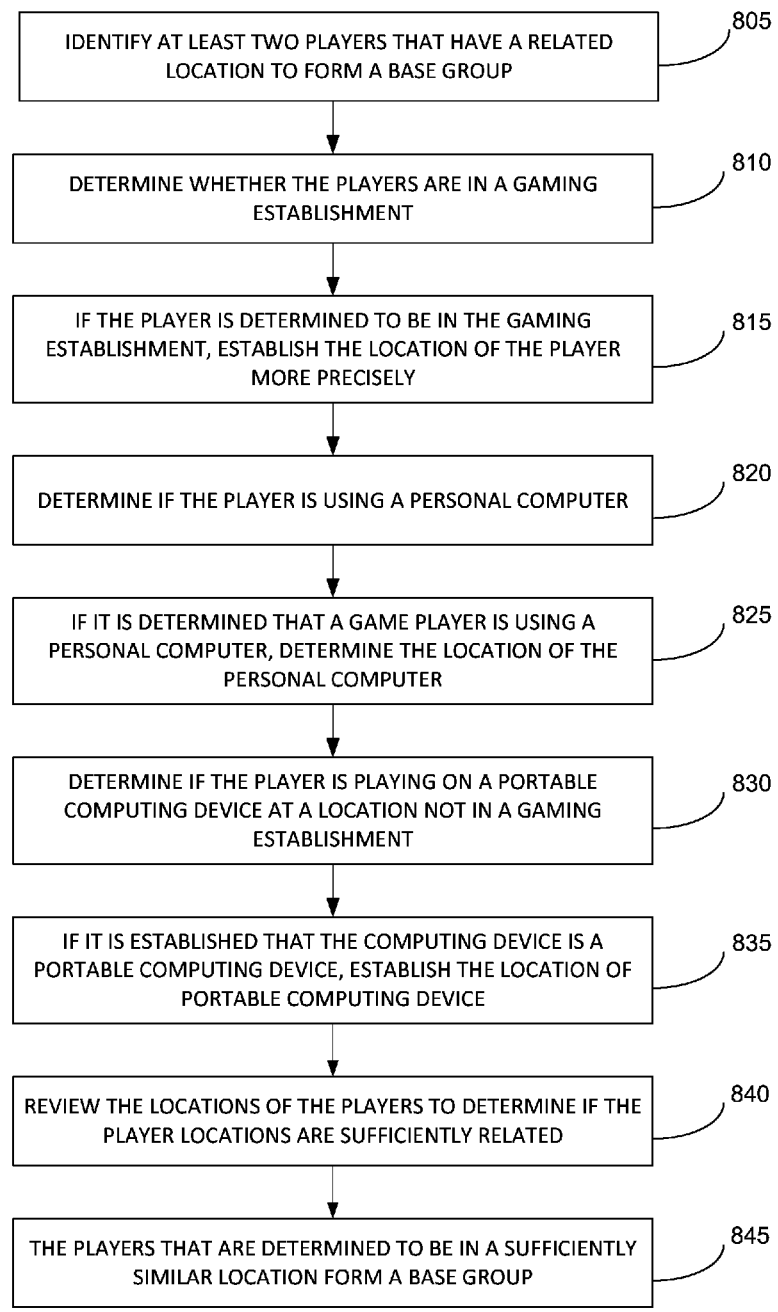
FIG. 8 is an illustration of a manner of selecting patrons to be in a base group.

FIG. 8 may illustrate a method of selecting players to be part of the focus group 920 920. At block 805, at least two players that have a related location 910 are identified to form a base group 900. The manner of determining the related location 910 may occur in a variety of ways as described in relation to FIG. 3. What is a related location 910 may depend on a variety of factors. In one embodiment and not limitation, the related location 910 may be a defined geographic area, such as an area in a gaming establishment such as a casino. In other embodiments, the defined geographical area may be much larger, especially where players are playing at home, are using portable computing devices 110 or there are few players playing which may make it more difficult to find players nearby. The term "area" is not meant to be limiting as "area" historically may have meant a physical location of a casino. The term "area" as used herein may be broader than just the physical location of a casino. At block 810, it may be determined whether the players are in a gaming establishment using at least one of the location unit 45, player tracking cards, visual analysis, floor sensors, Wi-Fi, GPS and cell phone triangulation. In some embodiments, players may be in a gaming establishment and may use player tracking devices such as player tracking cards 54. In these situations, it may be especially easy to establish the location of a group of players as the location may be registered through the player tracking cards 54. In some embodiments, the cards may have RFIDs which may be tracked.

At block 815, if the player is determined to be in the gaming establishment, the location of the player is attempted to be establish more precisely using at least one of player tracking cards 54, visual analysis, floor sensors, Wi-Fi, GPS and cell phone signal analysis. In yet another embodiment, a mobile computing device 110 may be used to help track the location of the player. For example, the identifier of a cell phone may be tied to a user and the path of that user may be tracked through the gaming establishment.

If the user cannot be established to be in a gaming establishment, at block 820, it may be determined if the player is using a personal computer. In some embodiments, some or all of the players may be using computing devices 10, 110 that are not in a gaming location such as at home using a personal computer.

If it is determined that a game player is using a personal computer as the gaming device 10, at block 825, the location of the personal computer may be determined. If the players are using a personal computer, the establishment of a location may be provided in a variety of ways. In some embodiments, the personal computers are located using IP addresses. In other embodiments, the user is asked for a location. In yet other embodiments, assuming sufficient permissions have been obtained, relevant files of a user, such as cookies, may be reviewed to obtain a location. In yet another embodiment, a locational database may be reviewed based on known data about the user to determine a location. Of course, other manners of establishing a location for a user are possible and are contemplated.

At block 830, it may be determined if the user is playing on a portable computing device 110 at a location not in a gaming establishment. In some embodiments, the gaming device 110 may have an electronic signature that may be recognized as a portable computing device 110. In other embodiments, the user may simply indicate the computing device is a portable computing device 110. In yet further embodiments, the player may be using an application that indicates the computing device is a portable computing device 110.

If it is established that the computing device 110 is a portable computing device 110, at block 835, the location of portable computing device 110 may attempted to be established using at least one of Wi-Fi, GPS, cell phone signal analysis as described previously. For example, GPS does not work especially well in gaming locations but works better in more open spaces, meaning GPS signals may be useful in establishing a location for the portable computing device 110.

At block 840, the locations of the players may be reviewed to determine if the player locations are sufficiently related. Players that are in a sufficiently related location may be more easily influenced to act in manner that is desired. As an example, if the players are in a certain part of a gaming establishment and a player is having great success on a gaming device 10, 110, players near the location may be determined to be sufficiently related. Similarly, if players are using personal computers and are in the same apartment building, the players may be determined to be in a sufficiently related location. The determination of whether the location of players is sufficiently related may be subject to a function which may score the players and have a minimum threshold for the players to be considered related.

What is a sufficiently similar location may depend on a variety of factors and may be determined by a location function. In some embodiments, the function may have different analysis for different computing devices 10, 110 and for different environments. As an example, in a gaming establishment, there may be many players in a relatively small location (which might be a weight in favor of deciding to place the players in a base group 900) but the players may be separated by a wall or may be in completely different rooms (which may weight against placing the players in a base group 900).

Figure 9:
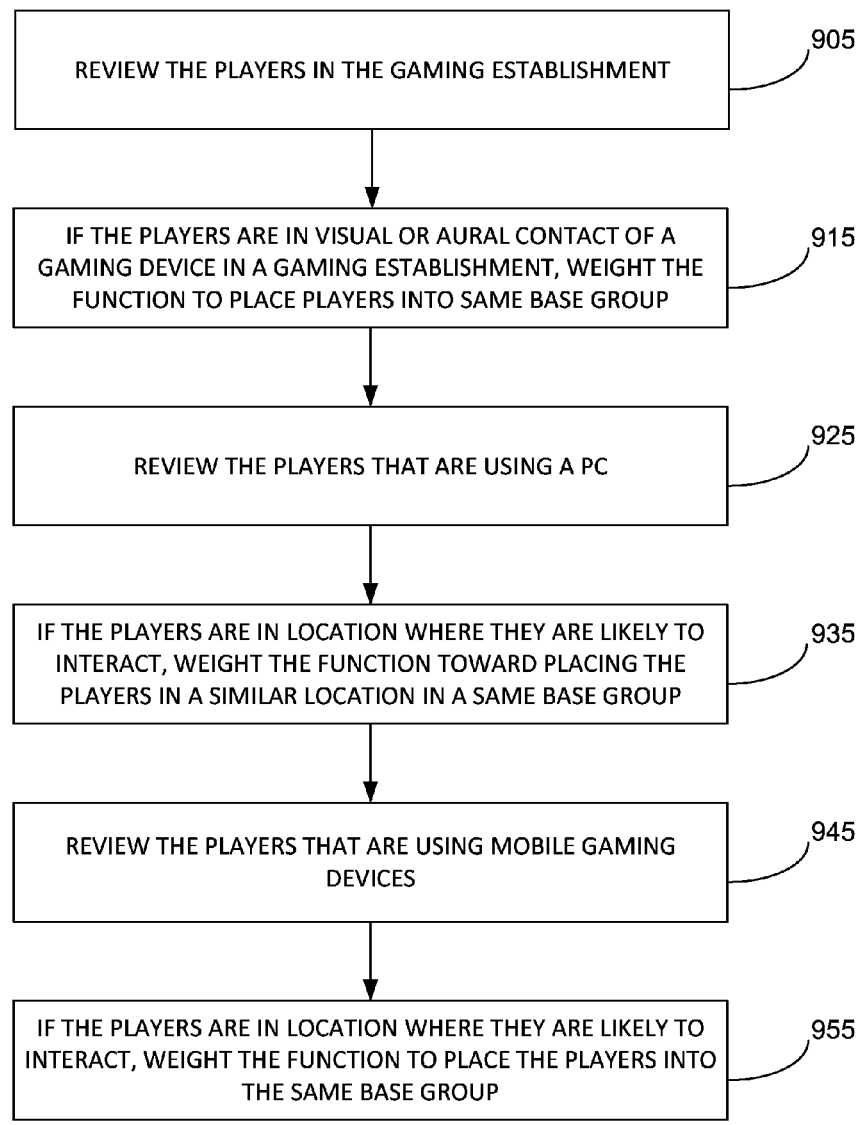
FIG. 9 is an illustration of a manner of determining if a location is sufficiently similar to create a base group.

FIG. 9 may be an example of a manner of determining whether players are in a sufficiently similar location. At block 905, the players in the gaming establishment may be reviewed. If the players are in visual or aural contact of a gaming device 10, 110, at block 915, the players may be placed into a base group 900. In the embodiment where a scoring function is used, the players near the gaming device 10, 110 may be given a high score. In some embodiments, the function may also take into account whether nearby gaming machines 10, 110 are configurable with modifiable elements 160. If the nearby gaming devices have modifiable elements 160, the function may be further weighted toward placing the players in a base group 900.

At block 925, the players that are using a personal computer may be reviewed to determine if the players are physically located in a region where they are likely to interact. At block 935, if the players are physically located in a region where they are likely to interact, the function may be weighted toward placing the players into a base group 900. For example, if the personal computer players are in the same school district, the function may be weighted toward placing the players in a base group 900 as the players may see each other often at the local school. Similarly, if the players are near a train station or are in the same condominium, they are likely to interact and the function may be weighted to place these players in the same base group 900.

At block 945, the players that are using mobile gaming devices 110 may be reviewed. If the players are presently in sufficient physical proximity that interaction among the players is likely, then at block 955, the function may be weighted to place the players into the same base group 900. The direction of travel may be taken into account by the function. For example, if the players all appear to be headed to a basketball stadium, the players may be placed into a base group 900 as they shortly will be interaction.

Players may belong to more than one base group 900 at a time as later analysis will further sift the players into smaller focus groups 920. For example, a player may be in a gaming establishment near a popular game which may place the player into a first base group 900. The player may have a portable phone that plays games and the portable computing device 110 may place the user into an additional base group 900.

At block 955, the players that are determined to be in a sufficiently similar location may form a base group 900. There may be more than one base group 900 as one group of players may be in a first location and a second group of players may be in a second location, meaning there may be two or more base group 900s at one time. In addition, players may move meaning the base group 900s may be dynamic as players may move into a location and other players may leave.

Figure 10:
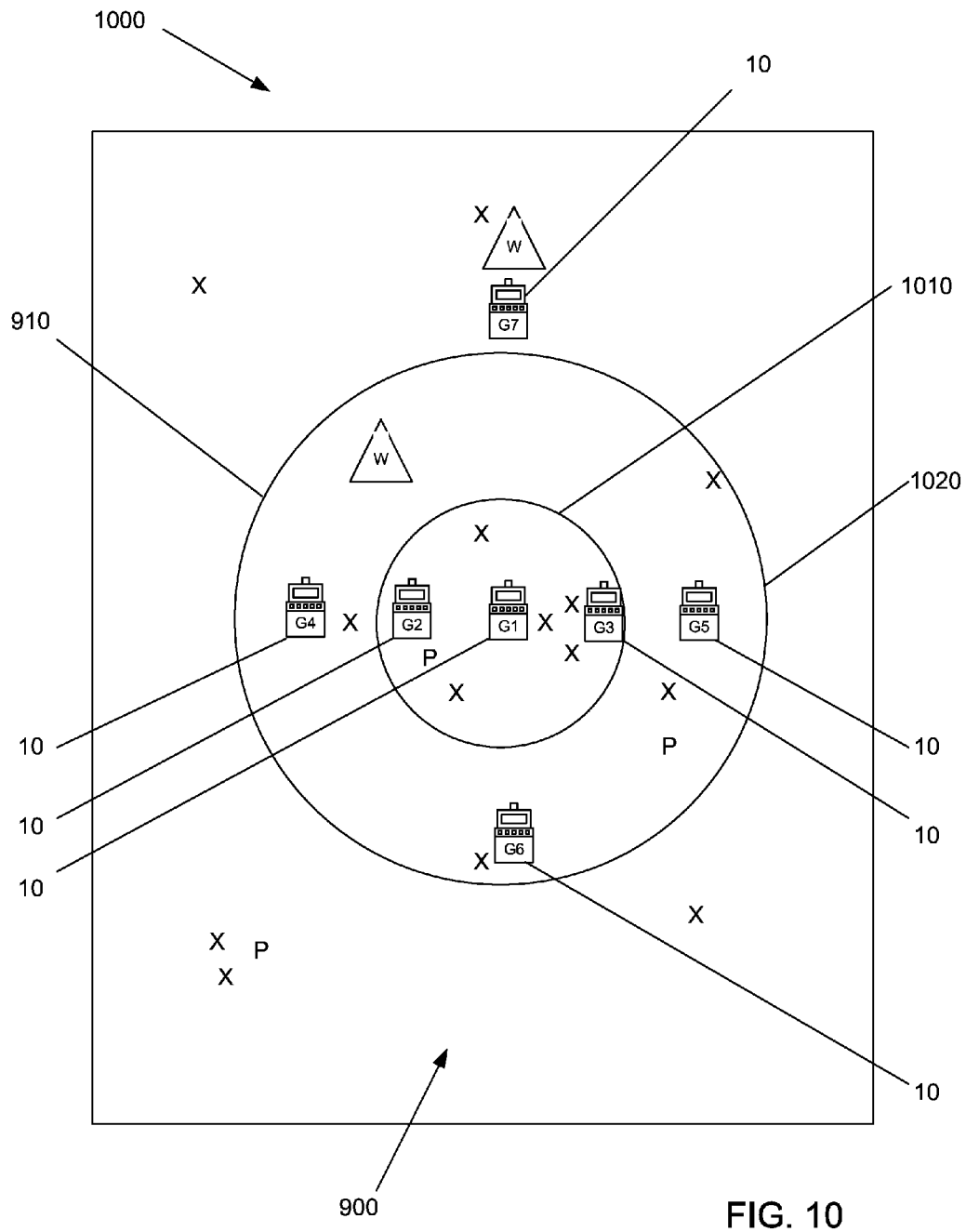
FIG. 10 is an illustration of a display of people in a related location.

FIG. 10 is an illustration of a display of players in a related location. The illustration may be used by a gaming establishment operator to view which games are currently attracting attention and game play. Further, game operators may use the view to better understand which games are being player by which people.

In the illustration of a display 1000 of FIG. 10, Game 10 (indicated as G1) may have a player that is having a tremendously successful run on a gaming machine 10 in a gaming establishment. The run may attract attention of others that are curious of the success of the gaming machine 10. The other players may be indicated by symbol that provide information about the players such as P for a penny slot player, W for a Whale (a moneyed gamer), X for a normal player, etc. The players also may be indicated by color or symbol in a way that an authority may be able to easily tell the type of players by simply looking at the display 1000.

Circles or other shapes that indicate distance 1010 and 1020 may be drawn in an effort to determine players that are in a location that is sufficiently related location 910 to be included in a base group 900. In FIG. 10, the inner circle 1010 may have five additional players and the outer circle 1020 may have six additional players. Outside the circle 1020, there may be an additional seven players. The circles may be adjusted to capture a base group 900 of a desired size. There is no requirement that a circle be used as the shape may be varied in a variety of ways.

Referring again to FIG. 7, once a base group 900 of users is created, at block 710, players from the base group 900 may be selected that have at least one related element 930 to form the focus group 920. At a high level, the related element 930 may be one or more attributes selected from a variety of attributes. For example and not limitation, some possible attributes include denomination preference, bonus preference, game preference, speed preferences, sound preference, player sex, player age, player height, player weight, player hair color and observed game preference. Again, these are just examples and not limitations as the related element 930 may vary depending on a variety of factors.

At block 720, related gaming elements 930 for the focus group 920 may be determined. The related gaming elements 930 may be determined in a variety of ways depending on the type of gaming device, the type of player tracking available, past experience and desired actions.

Figure 11:
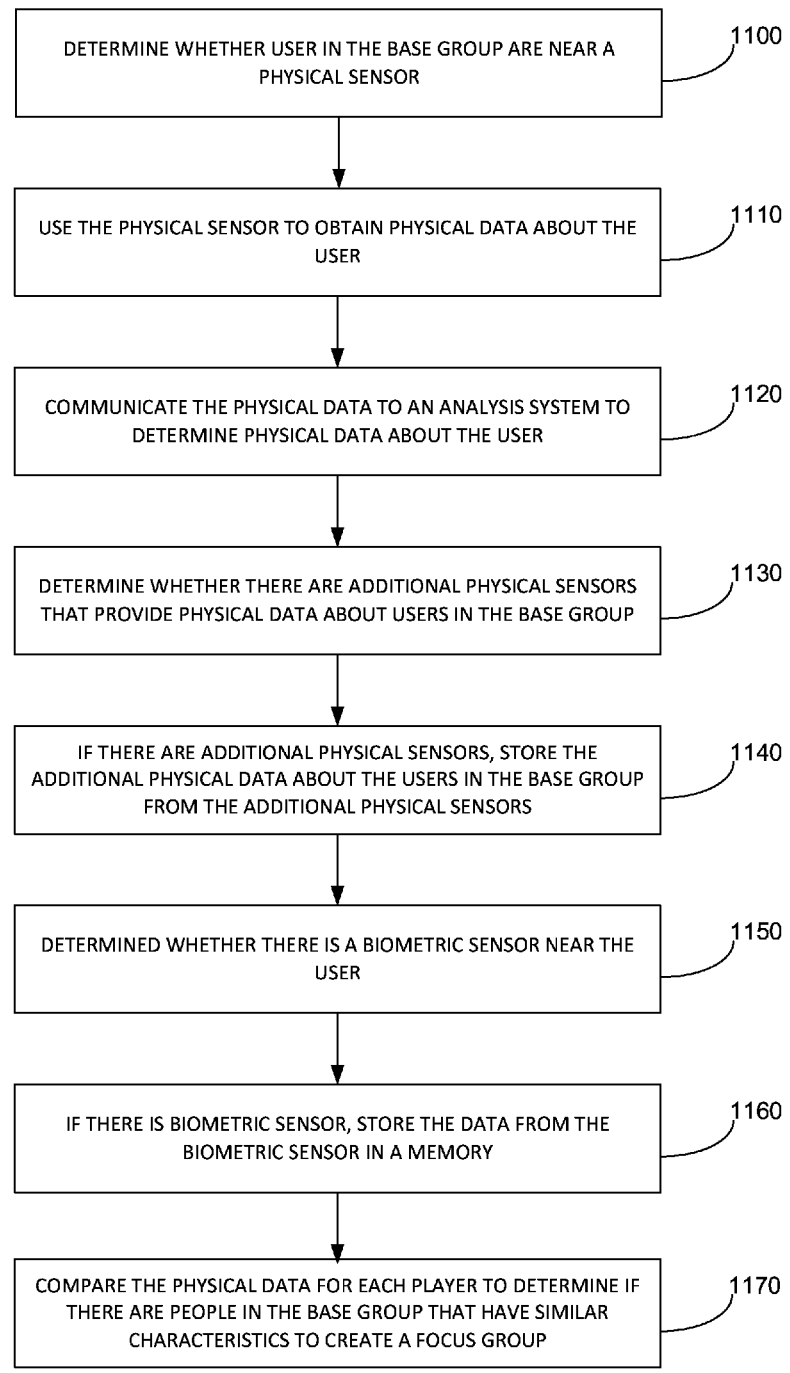
FIG. 11 is an illustration of a method of identifying related elements in the focus group.

FIG. 11 may illustrate one method of determining related elements 930 when a user does not have a player tracking card. In some embodiments, the detection of related elements 930 of the player may include sensing physical characteristics and biometric data. Some sample physical characteristics include player sex, player age, player height, player weight, player hair color, player clothing style and the observed game preference. The physical characteristics may be determined using a physical sensor 56 such as a camera that is in communication with the gaming unit 10, 110 and the images may be analyzed to create a best guess as to the physical characteristics.

At block 1100, it may be determined whether users in the base group 900 are near a physical sensor 56 (FIG. 1a). The physical sensor 56 may be a camera, a heat sensor, an inferred camera, a microphone, a weight sensor or any other device that senses physical characteristics of a user. The physical sensor 56 may be part of the gaming device 10, 110 such as a web cam attached to a laptop or may be a separate camera such as a camera in the ceiling of a gaming establishment or on a casino gaming unit 10. The location of physical sensors 56 may be known or may be queried, such as querying a user computing device 10, 110 whether it has a web cam.

If the user is near a physical sensor 56, at block 1110 the physical sensor may 56 be used to obtain physical data about the user. As an example and not limitation, if the physical sensor 56 is a camera, the camera may be used to take a physical picture of the user.

In addition, at block 1120, the physical data may be communicated to an analysis system and may be analyzed to determine physical data about the user. A module may review the physical data and may attempt to determine physical characteristic of the user. Some sample physical characteristics include player sex, player age, player height, player weight, player hair color, voice, player clothing style and the observed game preference. In some instances, the data may be unclear and a scoring system may be used to attempt to make logical guesses or estimates as to the physical characteristics. As an example, the user may be wearing a winter coat making identification of a user's weight difficult, however, the user may be determined to be 6'4" and a weight estimate may be made based on the height and a confidence score may be used to indicate the confidence of the weight estimate.

In addition, there may be a plurality of physical sensors 56 that may be available. For example, there may be a sensing apparatus in the floor of a gaming establishment that may sense physical presence and weight. In addition, there also may be cameras that take images near the sensing apparatus. At block 1130, it may be determined whether there are additional physical sensors 56 that may provide physical data about users in the base group 900. At block 1140, if it is determined that there are additional physical sensors 56, the additional physical data about the users in the base group 900 from the additional physical sensors 56 may be stored.

At block 1150, it may be determined whether there is a biometric sensor near the user. In some embodiments, biometric measuring devices may be the physical sensor 56 in communication with the gaming device 10, 110 and may be used to determine biometric information about members in the base group 900. Biometric information may include data regarding a player's mood, level of interest, etc. At block 1160, if there is biometric sensor, then the data from the biometric sensor may be stored in a memory.

At block 1170, as the observed data is received, the physical data for each player may be compared to determine if there are people in the base group 900 that have similar characteristics to create a focus group 920. For example, if a base group 900 has a selection of people that are determined to be excited, the excited people may be formed into a focus group 920. Similarly, if a base group 900 has a number of bearded men, a focus group 920 may be formed of the bearded men.

Figure 12:
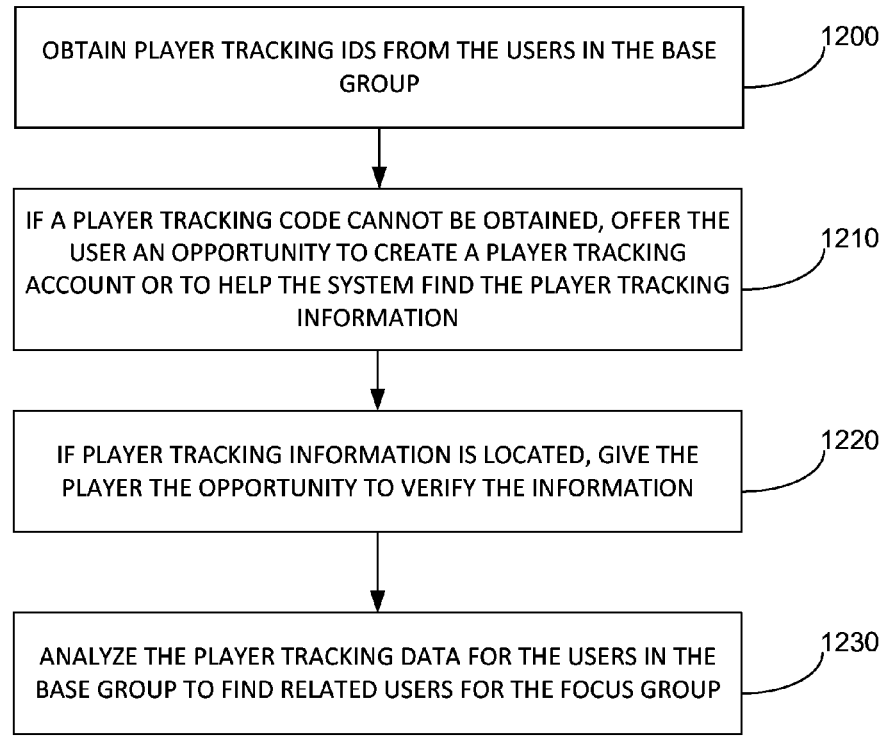
FIG. 12 is an illustration of another method of identifying related elements in the focus group.

FIG. 12 may illustrate a manner of determining a focus group 920 from a base group 900 when the users in the group have player tracking id 58. At block 1200, player tracking ids 58 may be obtained from the users in the base group 900. The player tracking ids 58 may be obtained in a variety of ways. In some embodiments, the user may be asked to input the player tracking ids 58. The player tracking id 58 may be an email address, a phone number, a series of digits and or numbers that are unique to the user. In other embodiments, a player tracking card 54 is fed into a card reader or placed in front of a reader and the player tracking id 58 is obtained from the card.

In other embodiments, the player tracking id 58 may be an RF id or other wireless id that provides a unique identifier to a user. The player id 58 may be obtained from the user with virtually no input from the user. For example, an RF reader may be part of the physical sensor 56 and may be placed near a gaming device 10, 110 and the reader may obtain the code, submit it to a database and attempt to find a match.

In yet additional embodiments, the player tracking id 58 is a form of physical unique identification such as a fingerprint or a scan of a cornea. The player may look into a camera 56 or swipe a finger on the touch screen 28 to provide the unique physical input. The scanned data may be compared to data in a database in the hopes that a match may be found.

In yet another additional embodiment, if the user is using a portable 110 or personal computing device 10, player tracking data 58 may be stored on the computing device 10, 110. The data 58 may be stored as a certificate or as an encrypted file. In yet another embodiment, the data 58 may be stored as a cookie that is available to a remote computing device 50.

At block 1210, if a player tracking code 58 cannot be obtained, the user may be offered an opportunity to create a player tracking account 58 or to help the system find the player tracking information. The player tracking 58 creation may occur at the gaming device 10, 110 or at a separate location. In addition, a temporary player tracking code 58 may be offered.

At block 1220, if player tracking information 58 is located, the player may be given the opportunity to verify the information 58. As a result, the player may be confident that the appropriate account is being credited. The information 58 may be view on the gaming device 10, 110 and the player may have the option to review, modify, delete or add to the information.

Figure 13:
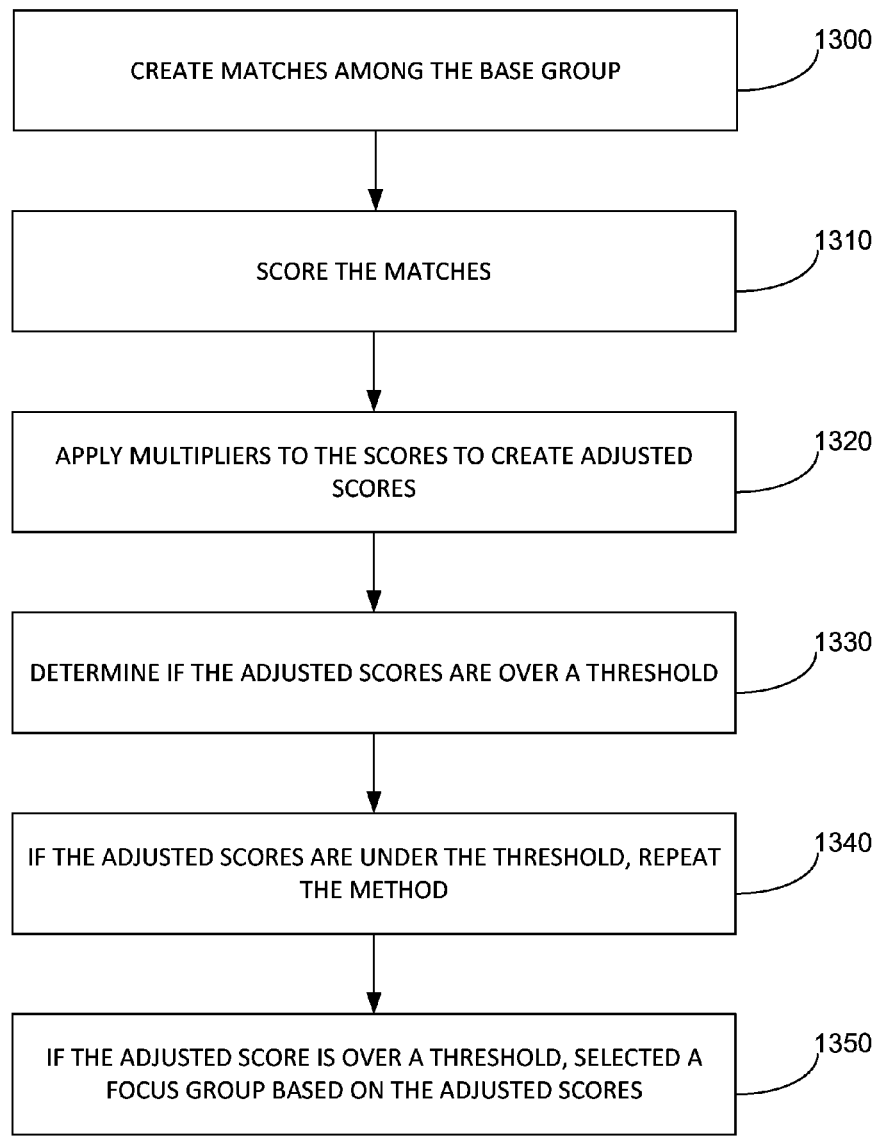
FIG. 13 is an illustration of scoring related elements in the focus group.

At block 1230, the player tracking data 60 (FIG. 14) for the users in the base group 900 may be analyzed to find related users for the focus group 920. Player tracking data 60 may include a large variety of data ranging from favorite games to preferred sound levels. The analysis may entail using a scoring function to determine related users for the focus group 920. FIG. 13 describes one manner out of the many manners of scoring elements related to players to determine which members of the base group 900 may be combined into the focus group 920.

In some embodiments, the comparison of the user data may 60 be given confidence scores. The confidence scores may indicate the predicted relevance of the user elements. For example, a confidence score of a base group 900 of men that wear similar hats such as NY Jets hats, being related may be high. At the same time, the confidence score of a group of women that wear earrings may be low as virtually all women wear earrings and there is nothing special that would indicate confidence that the women in earrings should form a focus group 920. The scoring may be based on a formula that provides confidence scores of the different physical aspects that would indicate the users are similar and should be placed in a focus group 920 together.

At block 1300, matches among the base group 900 may be created. Player tracking data 60 may be sorted into categories and the data in each category may be compared to create matches. As mentioned earlier, the user data 60 may be data from a player tracking card 54, may be physically observed data, may be biometric data or may be a combination of player tracking, physical and biometric data.

At block 1310, the matches may be scored. Some matches may be close but not exact. For example, a user that is 5'8" may be sufficiently similar to a user that is 5'7" even though 5'8" is not an exact match to 5'7". Similarly, someone that likes sound as a low volume may be sufficiently similar to a user that like sound at a soft volume.

At block 1320, multipliers may be applied to the scores where multipliers represent predicted relevancy of matches to create adjusted scores. Some matches may be more important than others. Over time, the matches that are more important may be determined through trial and error and these matches may be stored.

At block 1330, it may be determine if the adjusted scores are over a threshold. Some users just may not be sufficiently similar to create a focus group 920. By using a threshold, only groups that are predicted to be sufficiently similar may be created. In this way, groups are only created when there are sufficient links.

At block 1340, if the adjusted scores are under the threshold, the method may be repeated. In some embodiments, the method may run virtually continuously, always seeking to create additional focus groups 920 even after a first or second focus group 920 has been created. In other embodiments, the method may wait for period of time to create an additional focus group 920 where a first focus group 920 already exists. In some embodiments, the system may be able to work on several locations with several base group 900s at once while it tries to create a plurality of focus groups 920 which may be in different locations.

Further, users may be mobile. As an example, a user may walk through a gaming establishment such as a casino while considering the available games. The user may stop at a crowd gathered around a game that is generating excitement. As such, the user may be considered as part of a focus group 920 that may exist near the game. The user may then proceed to another part of the casino where additional activity is occurring. The user may then be considered for any focus groups 920 near the additional activity. As the user moves through the casino and the location is known, the user may be considered to be part of additional focus groups 920 that may exist throughout the casino. Of course, this concept may be applied in other situations such as when the user travels through a town in a car, walks through a town, rides a train, etc.

Player movement may also affect focus group limit calculations. For example, say there is a base group 900 of ten players with a resulting focus group 920 of six players for a specified physical location/area (the 'alpha' area) within the casino. Now say one of the players within the focus group 920 decides to leave the 'alpha' area, resulting in only five players remaining in the focus group for the 'alpha' area. Because one person walked outside the 'alpha' area, the reduction in focus group 920 size may trigger a recalculation of the focus group 920. Similarly, a new player could walk into the 'alpha' area, causing a recalculation of the focus group 920. In other words, if the membership of the focus group 920 or base group 900 hits a predefined threshold (high and/or low) of players, the group 900, 920 may be automatically re-calculated (or the casino may be notified that the threshold limits have been reached). Threshold may be based on number of players in base group, focus group, minimum/maximum period of time the focus group has been active, or feature attributes and the thresholds may be modified by an authority and may vary based on the gaming environment.

At block 1350, if the adjusted score is over a threshold, a focus group 920 may be selected. The threshold may be set by an authority and may be adjusted. The threshold may vary over time. For example, the threshold may be higher when a gaming establishment is crowded such as on a weekend night and may be lower when the casino is less busy such as on a weekday morning.

The focus group 920 may receive content on their gaming devices 10, 110 or nearby gaming devices 10, 110 which may be modified to attract the users. Modern gaming devices, which as previously mentioned, may be casino gaming devices 10, portable computing devices 110, cloud based devices or personal computers 10, can display a variety of games which may be considered attributes of the gaming device 10, 110. In addition, the games may be modified. Specifically, the games may have modifiable game elements 160 which are game attributes which are modifiable such as sound level, brightness, speed of play, game choice, bonus game options, etc.

Figure 14:
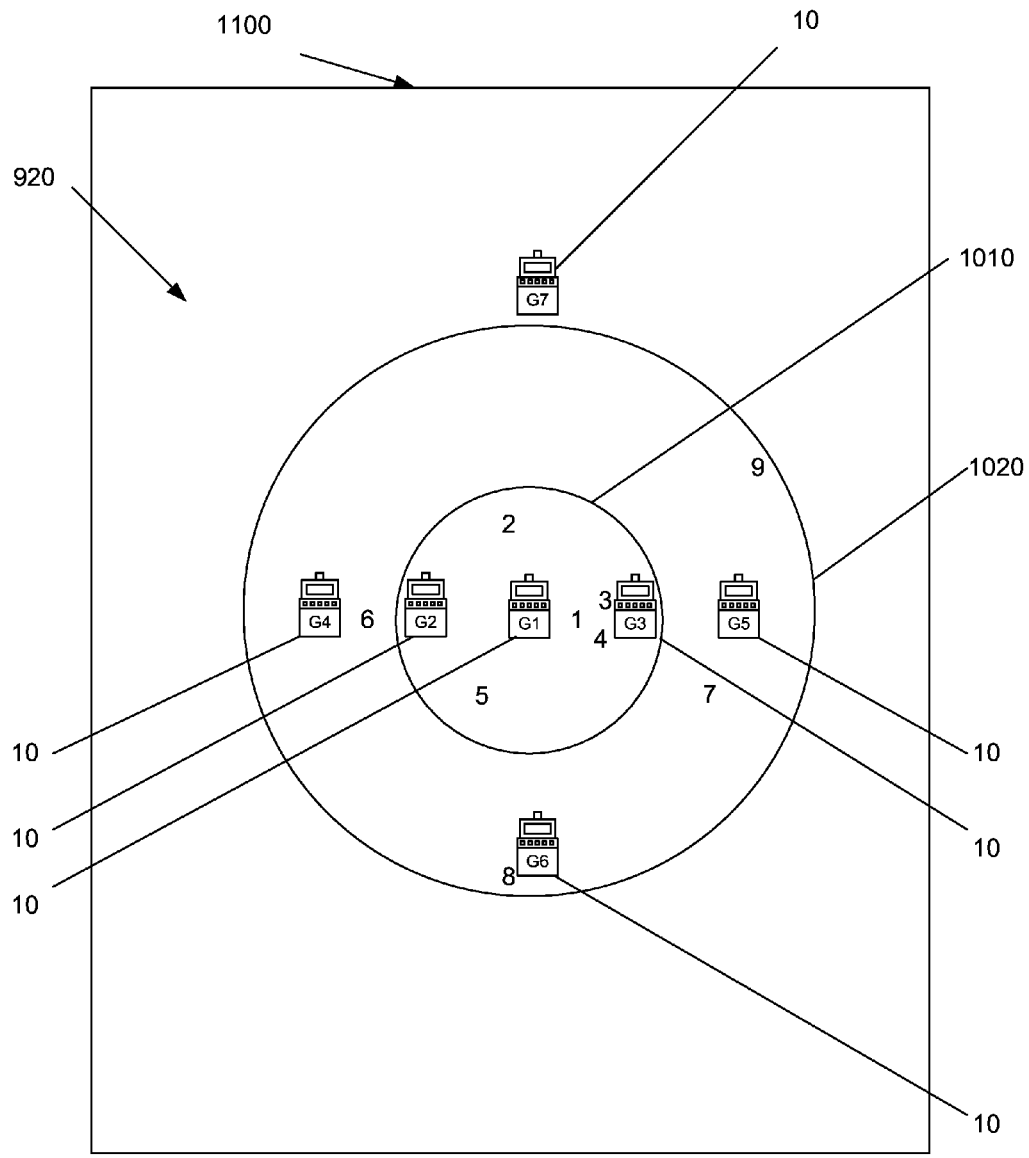
FIG. 14 is an illustration of a display of members in a focus group.

FIG. 14 is an illustration of a display 1100 of members in a focus group 920. As can be seen in comparison to FIG. 10, some of the players from the base group 900 have been removed, specifically, the P (penny) player and W (whales) have been removed and all the players outside the zone 1020 and the remaining X players have been numbered 1-9. Further, additional player tracking 60 information may be displayed about players 1-9 in separate region 1110, such as usual bet amount, desired sound level, favorite game, etc. The information 60 may also be color coded or underlined such that an operator may be able to easily make judgments about the focus group 920 by simply looking at the colors on the display.

Referring again to FIG. 7, at block 730 suggestions may be made to modify modifiable elements 160 of the gaming device based on the determined relevant game attributes 930 (FIG. 11) of the focus group 920. Issued U.S. Pat. No. 7,033,276, inventor Walker, describes some of the many ways of configuring a gaming machine based on user preferences and the disclosure of U.S. Pat. No. 7,033,276 is incorporated by reference in its entirety. The modifiable elements 160 may be adjusted to attempt to match the related elements 930. The match may be determined in a variety of ways. FIG. 15 may illustrate one manner of determining which of the modifiable elements 160 should be modified based on the focus group 920.

At block 1500, the related elements 930 may be configured into a related elements list. At block 1510, the modifiable elements 160 of the gaming device 10, 110 may be configured into a modifiable elements list. The modifiable elements 160 list may be in many forms. In some embodiments, the modifiable elements 160 are stored in a database and the modifiable elements 160 are queried from the database and stored in a memory 36. In other embodiments, the modifiable elements 160 are stored in a file, such as a flat file, and are ready to be compared to the related elements 930. Of course, the manner of storing the modifiable elements 160 is limited only by the imagination.

At block 1520, the related elements 930 list may be compared to the modifiable elements 160 list. The related elements 930 list may be in many forms. In some embodiments, the related elements 930 are stored in a database and the related elements 930 are queried from the database and stored in a memory. In other embodiments, the related elements 930 are stored in a file, such as a flat file, and are ready to be compared to the modifiable elements 160. Of course, the manner of storing the related elements 930 is limited only by the imagination.

At block 1530, a function may be used to score the comparison of the related elements 930 list to the modifiable elements 160 list. The function may operate in a variety of ways. In one embodiment, the function may be a text comparison. As an example and not limitation, the focus group 920 may have the game "Monopoly" as a related element 930 and the modifiable element 160 may be that the present game be changed to "Monopoly". If both the related element 930 and modifiable elements 160 have the same text, the function may give this comparison a high score. As yet another example and not limitation, the focus group 920 may have a related element 930 of the brightness being set "high" while the brightness may not be a modifiable element. Thus, the brightness related element 930 may score low in the function.

The function may have some baseline "common sense" rules to how to modify elements in view of the related elements 930. For example, if the focus group 920 indicates it likes loud sounds, then a long version of the sounds for the game may be used and additional sound effects may be added to the game. Similarly, if a first player near the group is playing a particular game and is having success and the group seems to be congregating near the first player, nearby games may be configured in a manner similar to the game around which the people are congregating.

The function may also review past related elements 930 and similar modifiable elements 160 to see if a desired behavior was obtained. If the past correlation was successful then the function may be modified to score this relationship higher. If the past correlation was not successful, then the function may be modified to score this relationship lower. The function may learn and evolve over time to attempt to obtain different behaviors. For example and not limitation, if a first attribute 930 and a first modifiable element 160 were deemed to be correlated and the result of the correlation was a significant increase in game play, then the function may be adjusted to increase the function score of the first attribute 930 and the first modifiable element 160. The function may be user specific, device specific, time specific, geographical area specific, etc.

The function may be adjusted based on additional factors. As an example, the environment of the gaming devises may be a basis for selecting a modification. If the gaming devices 10, 110 are in a gaming establishment and a specific music concert is occurring, the modifiable elements 160 of the gaming devices may be adjusted to complement the specific concert. Similarly, if a sporting event recently ended, the modifiable elements 160 may be adjusted to better relate to the sporting event. Further, the time of day, weather, current events, closeness to a restaurant, closeness to a shopping destination, etc. may be taken into account in determining which of the modifiable elements should be adjusted.

In addition, there may be a variety of desired outcomes and the functions may reflect the desired outcomes. For example, at some times, maximizing revenue from a game may be a desired outcome. At other times, game attraction may be desired. There may be separate functions based on the desired outcome. In addition, a single function may be adjusted based on the outcome desired.

At block 1540, the modified element 160 (or elements as more than one may be changed) may be suggested to be changed according to the determination of the relationship at block 1530. In some embodiments, an authority may oversee the suggestions and may make the determination to authorize the suggested change. In other embodiments, the suggestion may be reviewed by another module such as a change module that may review the suggestion and decide whether to execute the suggestion based on some criteria or a scoring function.

Figure 16:
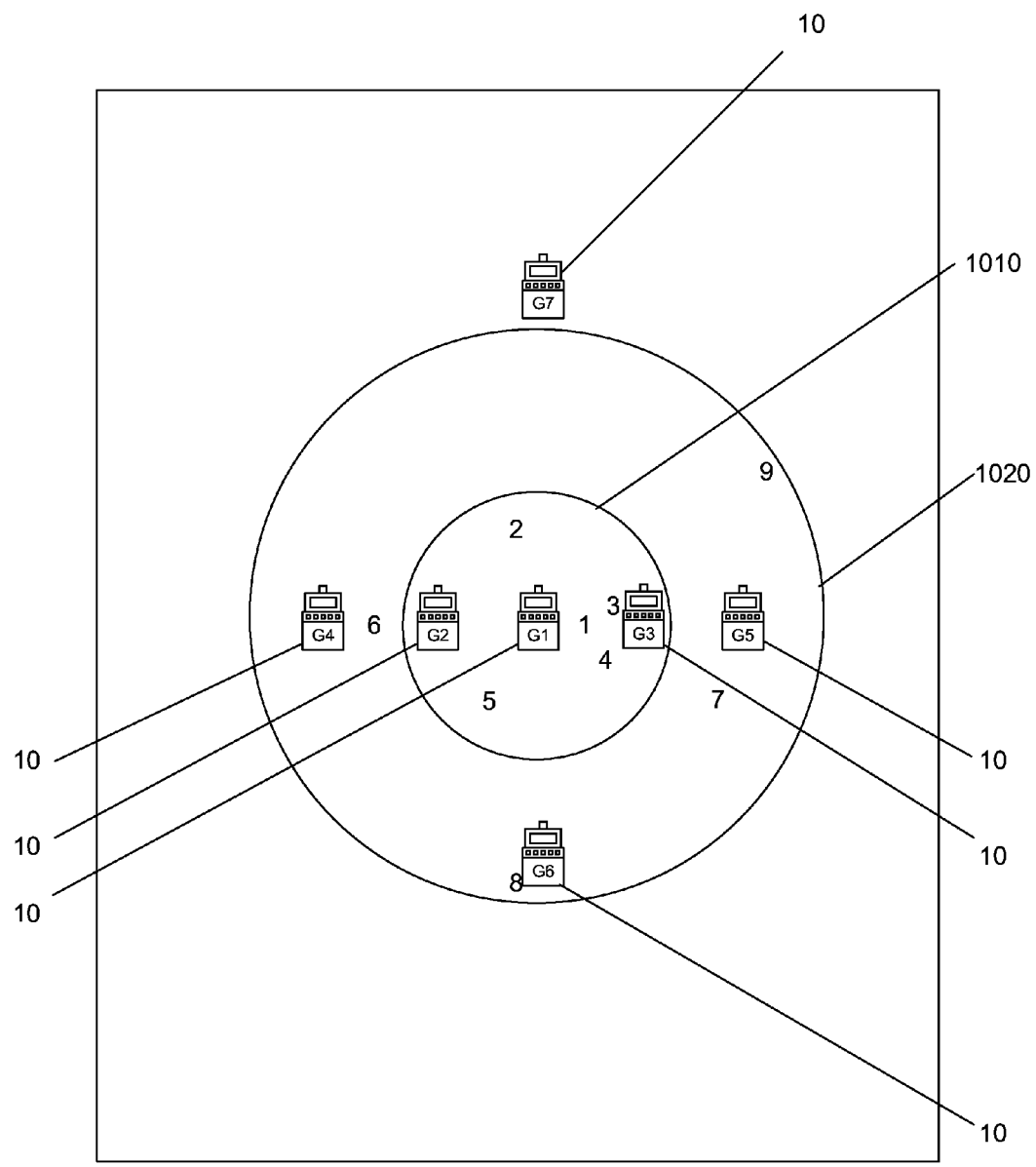
FIG. 16 is an illustration of a suggested modification to gaming content to a focus group.

FIG. 16 is an illustration of a suggested modification to modifiable gaming elements. The display 1600 may indicate a plurality of suggested changes to specific machines 10, 110 which may be ranked in an order. The operator may accept none, some or all of the suggestions for changes to be made on the games in order to entice members of the focus group 920 to take part in the game action. Again, the changes may be color coded. Further, the suggestions may be modified based on a desired outcome which may be modified by the operator. As an example, increased game play may result in a first set of suggestions and increased coin in may result in a second set of suggestions. These suggestions may be displayed on the same page and may be color coded differently.

Referring again to FIG. 7, at block 740 if the modified game content is accepted, the modified gaming content 160 may be executed on the computing device 10, 110. The changes may be made in a variety of ways depending on type of computing device 10, 110 and the location. If the computer executable code is stored locally, a signal may be communicated that the modifiable element 160 should be changed. If the computer executable code is stored remotely such as in a cloud or on a server, the images and related elements may be created remotely and communicated to the computing device 10, 110 with the modifiable elements 160 changed. Of course, the manner of controlling the game, either locally, remotely or through a cloud or a combination thereof, is contemplated and is intended to be included.

In action, the various embodiments of the method may operate automatically or may create suggestions that may be made to an operator. The results of the various embodiments of the method may be that games players may be sorted into focus groups 920 based on location and preferences and the games near the focus group 920 may be modified to attract play from the players in the focus group 920 such as to play a game that has generated excitement nearby. By modifying the technical elements of the gaming machine 10, 110, interest may be generated for a group.

The figures, described by way of example above, represents algorithms that correspond to at least some instructions executed by the CPU 30 in FIG. 2*a* to perform the above described functions associated with the disclosed concepts. Each of these embodiments and obvious variations thereof is contemplated as falling within the spirit and scope of the following claims. Moreover, the present concepts expressly include any and all combinations and subcombinations of the preceding elements and aspects.

The invention claimed is:

1. A method of attracting patrons to a gaming system, the method comprising:

sensing, via a physical sensor, at least one physical attribute associated with patrons who are in a predetermined proximity to one or more gaming machines;

selecting, at the computer system, one or more of the sensed physical attributes common to two or more of the patrons;

matching, at the computer system, the selected one or more sensed physical attributes common to the patrons to modifiable elements of the one or more gaming machines in the predetermined proximity to the patrons;

selecting, at the computer system, a modification for the one or more gaming machines from the modifiable elements that match the selected one or more sensed physical attributes common to the patrons in the predetermined proximity to the one or more gaming machines;

changing, via the computer system, operation of the one or more gaming machines in the predetermined proximity to the patrons according to the selected modification.

2. The method of claim 1, wherein sensing at least one physical attribute associated with patrons who are in the predetermined proximity to the one or more gaming machines comprises sensing at least one physical attribute associated with patrons who are within audio or visual range of the one or more gaming machines.

3. The method of claim 1, further comprising:

presenting, via the computer system, the selected modification to an approval authority, wherein changing operation of the one or more gaming machines in the predetermined proximity to the patrons is responsive to approval by the approval authority.

4. The method of claim 1, wherein matching the selected one or more sensed physical attributes comprises assigning a value based on a similarity of each modification to the one or more sensed physical attributes common to the patrons; and selecting the modification having a greatest similarity to the sensed physical attributes common to the patrons as the modification.

5. The method of claim 1, wherein the one or more physical attributes associated with each of the patrons comprises at least one physical attribute selected from a group of characteristics consisting of patron sex, patron age, patron height, patron weight, and patron hair color.

6. The method of claim 1, wherein the one or more physical attributes associated with each of the patrons comprises patron clothing style.

7. The method of claim 1, wherein the physical sensor is a camera.

8. The method of claim 1, wherein selecting the modification for the one or more gaming machines comprises selecting at least one modification from a group of modifications consisting of game selection, denomination, bonus structure, speed of play, and sound volume.

9. A wagering game system architecture comprising:

one or more gaming machines;

a physical sensor that senses a physical attribute of patrons who are in a predetermined proximity to the one or more gaming machines; and a computer system coupled to the physical sensor and to the one or more gaming machines, the computer system including computer executable instructions that cause the computer system to: select one or more of the sensed physical attributes common to two or more of the patrons in the predetermined proximity to the one or more gaming machines;

match the selected one or more sensed physical attributes common to the patrons to modifiable attributes of the one or more gaming machines in proximity to the patrons;

select a modification for the one or more gaming machines from the modifiable attributes that match the selected one or more sensed physical attributes common to the patrons in predetermined proximity to the one or more gaming machines; and change operation of the one or more gaming machines in the predetermined proximity to the patrons according to the selected modification.

10. The wagering game system architecture of claim 9, wherein the predetermined proximity to the one or more gaming machines is within an audio or visual range of the one or more gaming machines.

11. The wagering game system architecture of claim 9, wherein the computer system has further instructions that cause the computer system to present the selected modification to an approval authority, wherein changing operation of the one or more gaming machines in the predetermined proximity to the patrons is responsive to approval by the approval authority.

12. The wagering game system architecture of claim 9, wherein the instructions that cause the computer system to match the selected one or more sensed physical attributes include instructions that cause the computer system to assign a value based on a similarity of each modification to the one or more sensed physical attributes common to the patrons and to select the modification having a greatest similarity to the characteristics common to the patrons as the modification.

13. The wagering game system architecture of claim 9, wherein the instructions that cause the computer system to select one or more sensed physical attributes common to two or more of the patrons includes instructions that cause the computer system to select at least one physical attribute selected from a group of physical attributes consisting of patron sex, patron age, patron height, patron weight, and patron hair color.

14. The wagering game system of claim 9, wherein the one or more physical attributes comprises patron clothing style.

15. The wagering game system of claim 9 wherein the physical sensor is a camera.

16. The wagering game system architecture of claim 9, wherein the computer instructions that cause the computer system to select the modification for the one or more gaming machines includes code that causes the computer system to select at least one modification from a group of modifications consisting of game selection, denomination, bonus structure, speed of play, and sound volume.

17. A method of attracting patrons to a gaming system, the method comprising:

tracking, via a physical sensor, patrons who are in one of audio range or visual range of one or more gaming machines;

determining, at a computer system coupled to the player identification apparatus, tracked physical attributes associated with each of the tracked patrons;

selecting, at the computer system, one or more of the tracked physical attributes common to the tracked patrons;

matching, at the computer system, the selected one or more tracked physical attributes common to the tracked patrons to modifiable elements of the one or more gaming machines in proximity to the tracked patrons;

selecting, at the computer system, a modification for the one or more gaming machines from the modifiable elements that match the selected one or more tracked physical attributes common to the tracked patrons in said proximity to the one or more gaming machines;

changing, via the computer system, operation of the one or more gaming machines in said proximity to the tracked patrons according to the selected modification.

18. The method of claim 16, further comprising:
presenting, via the computer system, the selected modification to an approval authority, wherein changing operation of the one or more gaming machines in the predetermined proximity to the tracked patrons is responsive to approval by the approval authority.

19. The method of claim 16, wherein determining physical attributes associated with each of the tracked patrons comprises selecting physical attributes including patron clothing style.

20. The method of claim 16, wherein determining physical attributes associated with each of the tracked patrons comprises sensing patron sex, patron age, patron height, patron weight, and patron hair color.

* * * * *